United States Patent
Tokushima et al.

(10) Patent No.: US 9,336,467 B2
(45) Date of Patent: May 10, 2016

(54) INFORMATION PROCESSING APPARATUS, INFORMATION PROCESSING SYSTEM, AND RECORDING MEDIUM

(71) Applicants: Yuji Tokushima, Kanagawa (JP); Yoshinori Sochi, Tokyo (JP); Yosuke Aoki, Kanagawa (JP)

(72) Inventors: Yuji Tokushima, Kanagawa (JP); Yoshinori Sochi, Tokyo (JP); Yosuke Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/626,240

(22) Filed: Feb. 19, 2015

(65) Prior Publication Data

US 2015/0242723 A1    Aug. 27, 2015

(30) Foreign Application Priority Data

Feb. 21, 2014  (JP) .................................. 2014-031996
Feb. 10, 2015  (JP) .................................. 2015-024276

(51) Int. Cl.
*G06K 15/02* (2006.01)
*G06K 15/00* (2006.01)
*G06F 3/12* (2006.01)

(52) U.S. Cl.
CPC .......... *G06K 15/1807* (2013.01); *G06F 3/1211* (2013.01); *G06F 3/1275* (2013.01); *G06F 3/1282* (2013.01); *G06K 15/002* (2013.01); *G06K 15/1848* (2013.01)

(58) Field of Classification Search
USPC ................................................ 358/1.15, 1.9
See application file for complete search history.

(56) References Cited

U.S. PATENT DOCUMENTS

| | | | | |
|---|---|---|---|---|
| 7,999,958 B2* | 8/2011 | Matsuda | ............ | G03G 15/6582 358/1.15 |
| 8,054,494 B2* | 11/2011 | Takahashi | ............. | G06F 3/1205 358/1.15 |
| 2003/0001853 A1* | 1/2003 | Obayashi | ................. | G09G 5/14 345/568 |
| 2009/0051947 A1* | 2/2009 | Kuroshima | ............ | G06Q 30/06 358/1.9 |
| 2009/0279125 A1 | 11/2009 | Liu et al. | | |
| 2011/0051156 A1* | 3/2011 | Yorimoto | ............. | H04N 1/6011 358/1.9 |
| 2012/0154860 A1* | 6/2012 | Ito | ......................... | G06F 3/1206 358/1.15 |
| 2012/0287463 A1* | 11/2012 | Iida | ....................... | G06F 3/1205 358/1.15 |

FOREIGN PATENT DOCUMENTS

| | | |
|---|---|---|
| JP | 2009-271930 | 11/2009 |
| JP | 2012-238188 | 12/2012 |
| JP | 2013-088992 | 5/2013 |

* cited by examiner

*Primary Examiner* — Allen H Nguyen
(74) *Attorney, Agent, or Firm* — Duft Bornsen & Fettig LLP

(57) ABSTRACT

An information processing apparatus for generating drawing data by using a print job, includes a plurality of drawing data generation units generating the drawing data by using the print job; a determination unit analyzing the print job and determining any one of the drawing data generation units that is to generate the drawing data by using the print job; and a screen display unit displaying a display screen of settings of the print job on a display part by selecting the display screen based on a result determined by the determination unit.

11 Claims, 25 Drawing Sheets

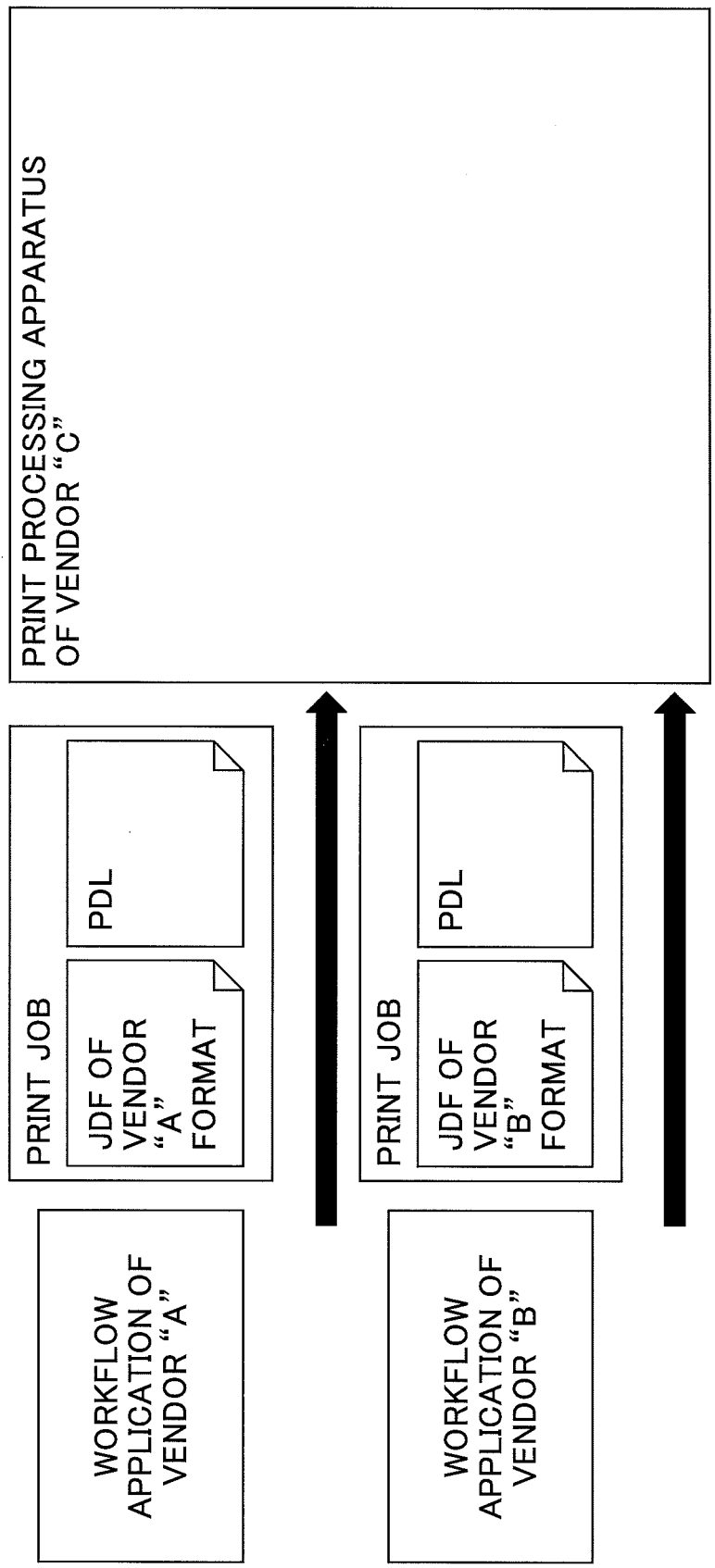

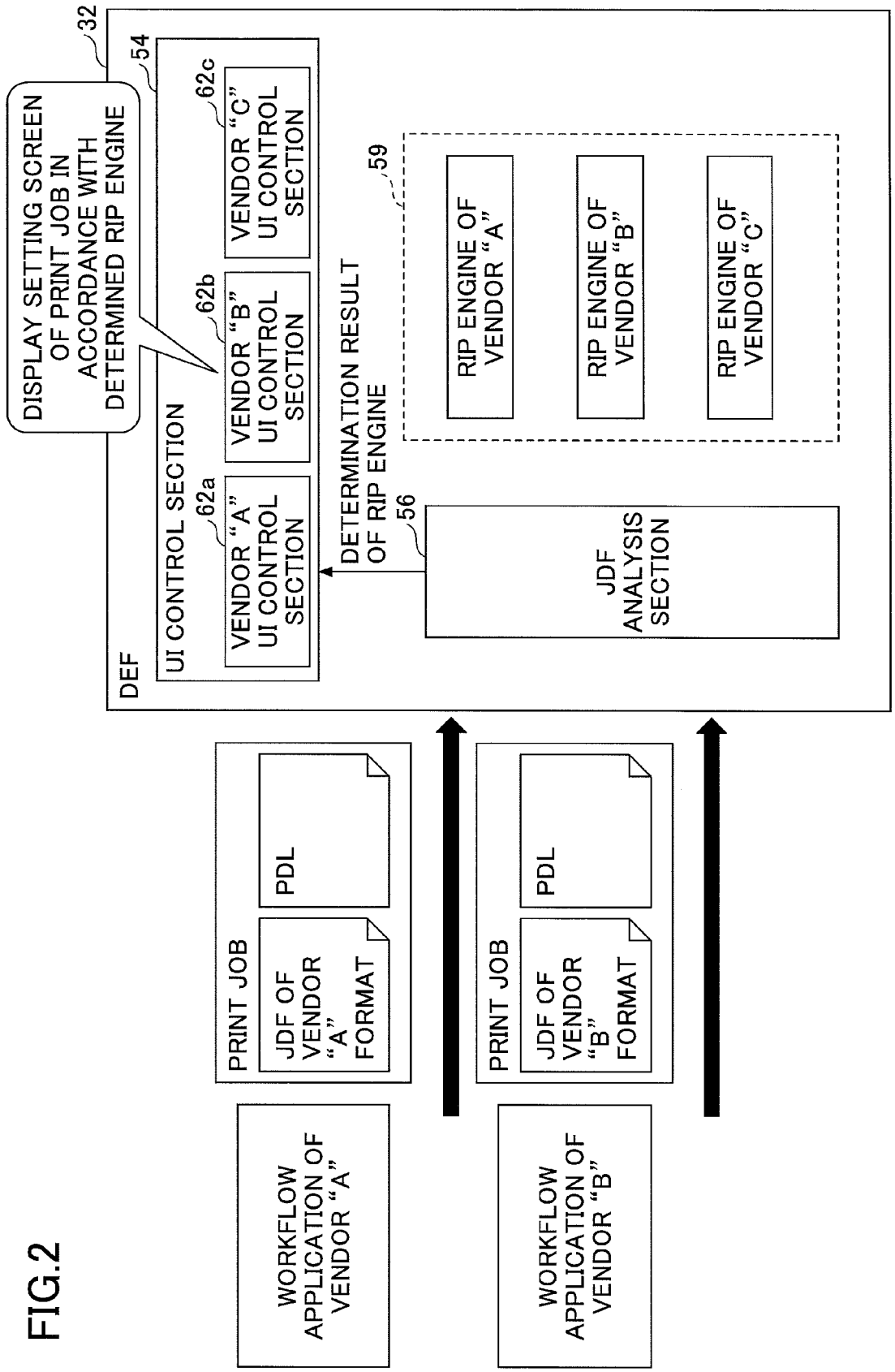

FIG.6A

```
<JDF xmlns="http://www.CIP4.org/JDFSchema_1_1" xmlns:C="www.ccc.com/schema/ccc" ...>
  ...
  <ResourcePool>
    <ComponentLink ... Amount = "2" ... />
    <LayoutPreparationParams ... Rotate = "Rotate90" ... >
      ...
    </LayoutPreparationParams>
  </ResourcePool>
  ...
</JDF>
```

FIG.6B

```
<JDF xmlns="http://www.CIP4.org/JDFSchema_1_1" xmlns:A="www.aaa.com/schema/aaa" ...>
  ...
  <ResourcePool>
    <ComponentLink ... A:Amount = "2" ... />
    <LayoutPreparationParams ... A:Rotate = "Rotate1" ... />
    </LayoutPreparationParams>
  </ResourcePool>
  ...
</JDF>
```

```
<JDF xmlns="http://www.CIP4.org/JDFSchema_1_1" xmlns:B="www.bbb.com/schema/bbb" ...>
  <ResourcePool>
    ....
    <ComponentLink ... B:DeliveryAmount = "2" ... />
    <LayoutPreparationParams ... B:AlternateRotation = "false" .... B:Rotate = "1" >
    </LayoutPreparationParams>
    ....
  </ResourcePool>
  ....
</JDF>
```

| JDF OF VENDOR "C" | | DFE-INSIDE JOB ATTRIBUTE | |
|---|---|---|---|
| ATTRIBUTE NAME | VALUE | ITEM NAME | ITEM VALUE |
| Amount | 1~32767 | CIRCULATION | 1~32767 CIRCULATIONS |
| Rotate | | ROTATION | |
| | Rotate0 | | 0° ROTATION |
| | Rotate90 | | 90° ROTATION |
| | Rotate180 | | 180° ROTATION |
| | Rotate270 | | 270° ROTATION |
| ... | ... | ... | ... |

FIG.7B

| JDF OF VENDOR "A" | | DFE-INSIDE JOB ATTRIBUTE | |
|---|---|---|---|
| ATTRIBUTE NAME | VALUE | ITEM NAME | ITEM VALUE |
| A:Amount | 1~32767 | CIRCULATION | 1~32767 CIRCULATIONS |
| A:Rotate | 1 | ROTATION | 0° ROTATION |
| | 2 | | 90° ROTATION |
| | 3 | | 180° ROTATION |
| | 4 | | 270° ROTATION |
| ... | ... | ... | ... |

FIG.7C

| JDF OF VENDOR "B" | | DFE-INSIDE JOB ATTRIBUTE | |
|---|---|---|---|
| ATTRIBUTE NAME | VALUE | ITEM NAME | ITEM VALUE |
| B:DeliveryAmount | 1~32767 | CIRCULATION | 1~32767 CIRCULATIONS |
| B:AlternateRotation | true | ROTATION | |
| | false | | |
| B:Rotate | 1 | | 0° ROTATION |
| | 2 | | 90° ROTATION |
| | 3 | | 180° ROTATION |
| | 4 | | 270° ROTATION |
| | ... | ... | ... |
| ... | | | |

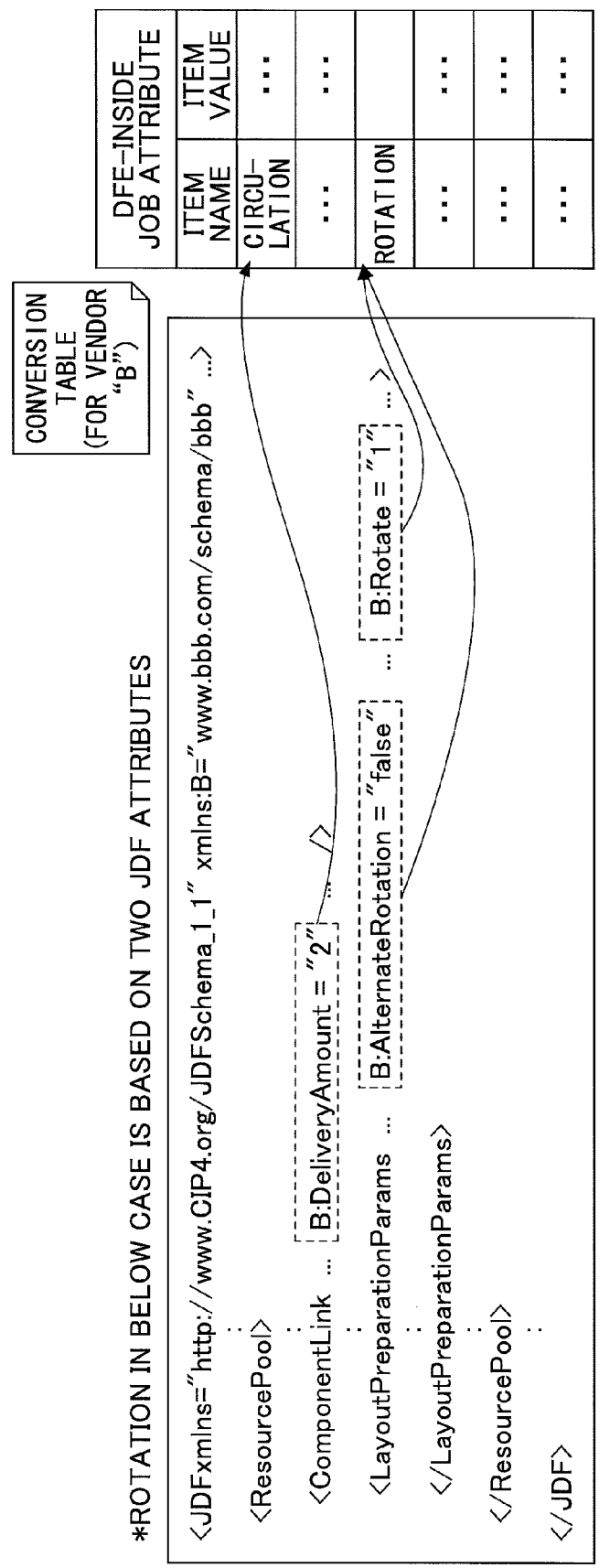

FIG.9

DFE-INSIDE JOB ATTRIBUTE

| | ITEMS | | |
|---|---|---|---|
| JOB INFORMATION | CIRCULATION | | |
| | DIRECTION INFORMATION | | |
| | PRINT SURFACE INFORMATION | | |
| | ROTATION | | |
| | ENLARGE/REDUCE | | |
| EDIT INFORMATION | IMAGE POSITION | OFFSET | |
| | | POSITIONAL ADJUSTMENT INFORMATION | |
| | LAYOUT POSITION | CUSTOM IMPOSITION LAYOUT | |
| | | NUMBER OF PAGES | |
| | | IMPOSITION INFORMATION | |
| | | PAGE ORDER INFORMATION | |
| | | CREEP POSITION ADJUSTMENT | |
| | MARGIN INFORMATION | | |
| | CROP MARK INFORMATION | CENTER CROP MARK INFORMATION | |
| | | CORNER CROP MARK INFORMATION | |
| FINISHING INFORMATION | COLLATE INFORMATION | | |
| | STAPLING/BINDING INFORMATION | | |
| | PUNCHING INFORMATION | | |
| | CREASING INFORMATION | | |
| | TRIMMING INFORMATION | | |
| | OUTPUT TRAY INFORMATION | | |
| | INPUT TRAY INFORMATION | | |
| | COVER SHEET INFORMATION | | |
| RIP CONTROL MODE (PAGE MODE OR SHEET MODE) | | | |

FIG.10

RIP Parameter List

| | | ITEMS |
|---|---|---|
| | | INPUT/OUTPUT DATA TYPE INFORMATION |
| | | INPUT/OUTPUT DATA READ/WRITE POSITION DESIGNATION METHOD INFORMATION |
| | | INPUT/OUTPUT DATA READ/WRITE POSITIONAL INFORMATION |
| | | INPUT/OUTPUT DATA READ/WRITE EXECUTION MODE INFORMATION |
| | | UNIT INFORMATION (DIMENSION) |
| | | INPUT/OUTPUT DATA COMPRESSION METHOD INFORMATION |
| | | RIP CONTROL MODE |
| INPUT/ OUTPUT IMAGE INFORMATION SECTION | INFORMATION RELATED TO OUTPUT IMAGE | IMAGE FORMAT TYPE |
| | | IMAGE FORMAT DIMENSION |
| | | IMAGE FORMAT RESOLUTION |
| | | IMAGE POSITION |
| | | COLOR SEPARATION INFORMATION |
| | | COLOR PLANE FIT POLICY INFORMATION |
| | | PLANE SHIFT INFORMATION |
| | | IMAGE FORMAT COLOR BIT NUMBER |
| | | IMAGE DIRECTION INFORMATION |
| | | IMAGING POSITIONAL INFORMATION |
| | | IMAGING SIZE INFORMATION |
| | | IMAGING METHOD INFORMATION |
| | | COLOR ICC INFORMATION |
| | | FONT SUBSTITUTION INFORMATION |
| | | IMAGING BASE POINT INFORMATION |
| | | FLAT K BLACK INFORMATION |
| | | RENDERING INFORMATION |
| | INFORMATION RELATED TO INPUT IMAGE | IMAGE FORMAT TYPE |
| | | IMAGE FORMAT DIMENSION |
| | | IMAGE FORMAT RESOLUTION |
| | | IMAGE POSITION |
| | | INPUT DATA |
| | | PAGE RANGE INFORMATION |
| | | COLOR ICC INFORMATION |
| | INFORMATION RELATED TO HANDLING OF IMAGE | SCALING OFFSET INFORMATION |
| | | OBJECT AREA INFORMATION |
| | | HALFTONE INFORMATION |
| | | SCALING ALGORITHM INFORMATION |
| INFORMATION RELATED TO PDL | DATA AREA | |
| | SIZE INFORMATION | |
| | DATA LAYOUT METHOD | |

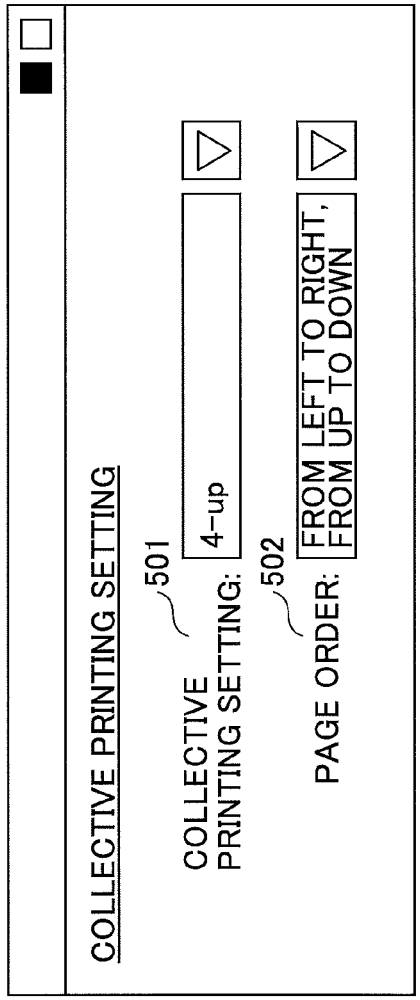

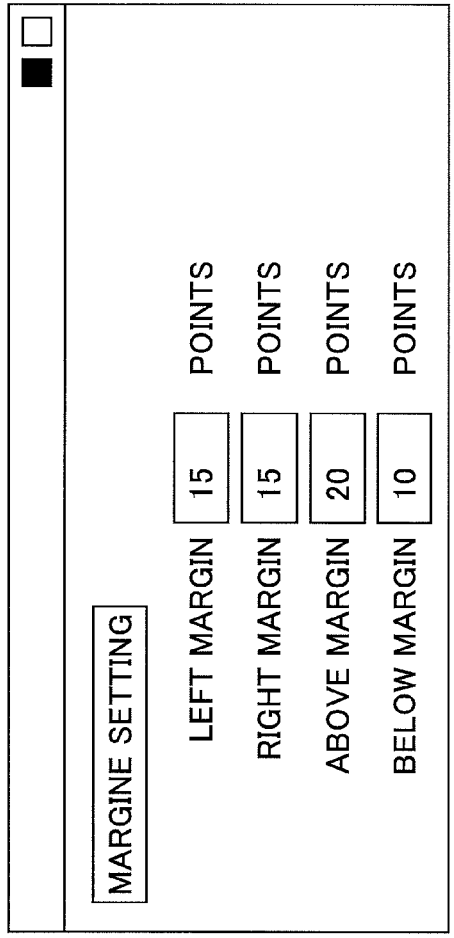

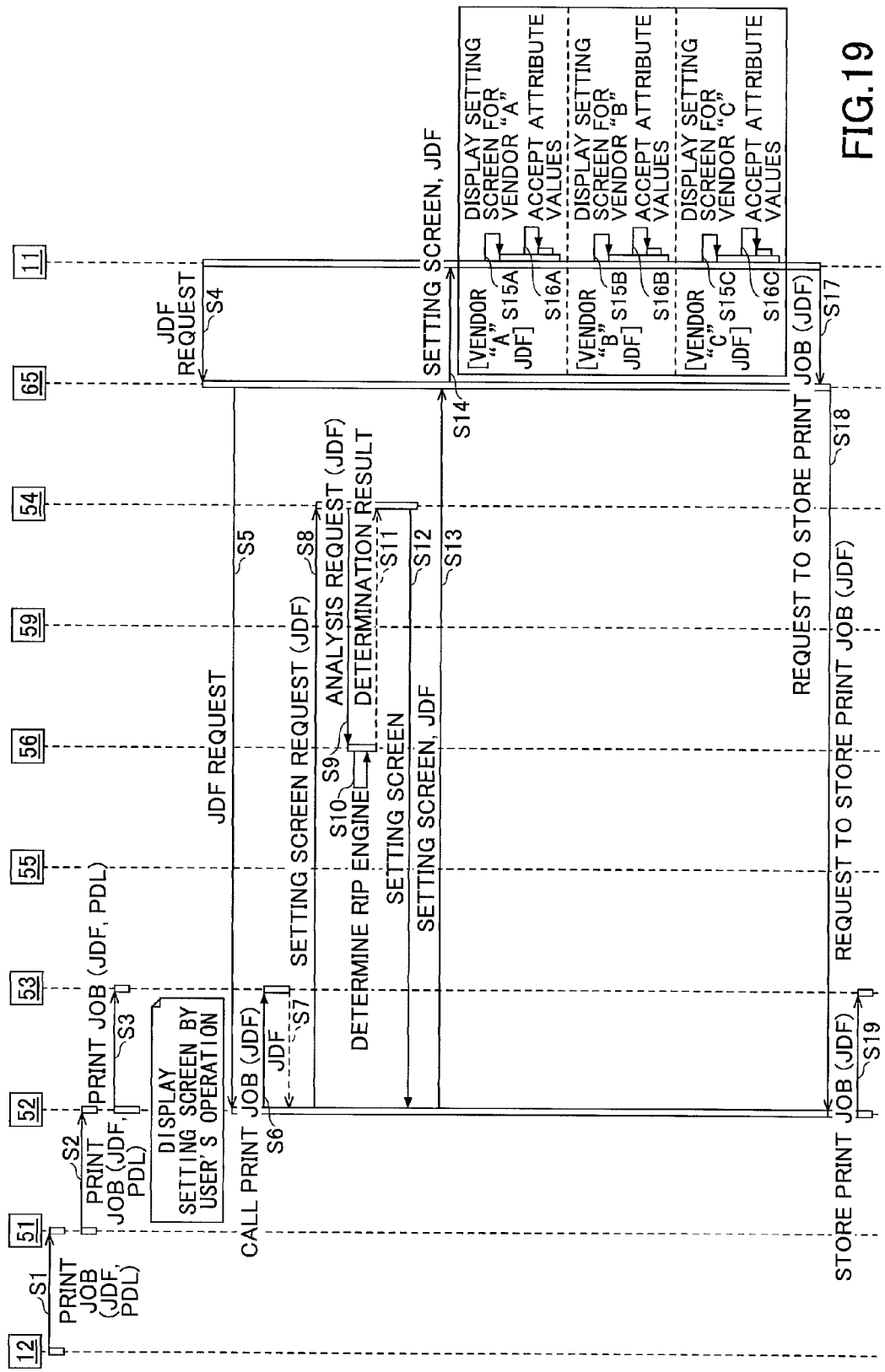

INFORMATION PROCESSING APPARATUS, INFORMATION PROCESSING SYSTEM, AND RECORDING MEDIUM

CROSS-REFERENCE TO RELATED APPLICATIONS

The present application is based on and claims the benefit of priority under 35 U.S.C §119 of Japanese Patent Application Nos. 2014-031996 filed Feb. 21, 2014 and 2015-024276 filed Feb. 10, 2015, the entire contents of which are hereby incorporated herein by reference.

BACKGROUND OF THE INVENTION

1. Field of the Invention

The present invention generally relates to an information processing apparatus and the like capable of generating drawing data by using a print job.

2. Description of the Related Art

There has been known a so-called "production printing" of printing a large quantity of documents and binding such documents into a book for professional use (see, for example, Japanese Patent Laid-open Publication No. 2012-238188). Japanese Laid-open Patent Publication No. 2012-238188 discloses a printing system capable of notifying a user of whether post processing can be used based on a status of a printing system as a whole.

SUMMARY OF THE INVENTION

According to an aspect of the present invention, an information processing apparatus for generating drawing data by using a print job includes a plurality of drawing data generation units generating the drawing data by using the print job; a determination unit analyzing the print job and determining any one of the drawing data generation units that is to generate the drawing data by using the print job; and a screen display unit displaying a display screen of settings of the print job on a display part by selecting the display screen based on a result determined by the determination unit.

BRIEF DESCRIPTION OF THE DRAWINGS

Other objects, features, and advantages of the present invention will become more apparent from the following description when read in conjunction with the accompanying drawings, in which:

FIGS. 1A and 1B are drawings illustrating an example of an inconvenience when an information processing apparatus receives a print job;

FIG. 2 is a drawing illustrating an example setting screen of a print job displayed by a Digital Front End (DFE) according to an embodiment;

FIGS. 6A through 6C are drawings illustrating examples of parts of descriptions of Job Definition Format (JDF);

FIGS. 7A through 7C are drawings illustrating examples of conversion tables;

FIGS. 8A through 8C are drawings illustrating generation of "DFE-inside job attribute";

FIG. 9 is a drawing illustrating an example of the "DFE-inside job attribute";

FIG. 10 is a drawing illustrating an example of "RIP Parameter List";

FIG. 11A is a drawing illustrating an example setting screen displayed by a user interface (U/I) control section of a vendor "A";

FIG. 11B is a drawing illustrating an example of the JDF generated by an application of the vendor "A";

FIG. 14A is a drawing illustrating another example setting screen displayed by a user interface (U/I) control section of the vendor "B";

FIG. 14B is a drawing illustrating another example of the JDF generated by an application of the vendor "B";

FIG. 19 is a sequence diagram of an example execution procedure of the print job performed by a client personal computer (PC).

DETAILED DESCRIPTION OF THE PREFERRED EMBODIMENTS

In related-art production printing, a print process is usually treated as a workflow. Further, a print workflow is more and more open. As a result, it becomes possible for venders who provide software solutions (workflow applications described below) or print apparatuses to describe settings in print jobs in main steps of printing using a common description method. As a format of describing an overall print workflow process, a standard format called "Job Definition Format (JDF)" is known.

The overall print workflow process includes various processes of generating a document or content, designating a print method, printing, post processing, etc. Basically, those processes are performed by various workflow applications or a print apparatus. However, by using the JDF, it becomes possible for print apparatuses to work together and to manage the print process.

However, there may be a case where the workflow applications or the print apparatus extends the JDF. In this case, the JDF generated by the workflow applications of the vendors may include a description specific to the workflow applications.

FIG. 1A illustrates an example of an inconvenience in a case where a print processing apparatus of vendor "C" receives print jobs. Here, note that FIG. 1 illustrates a comparative example and is not illustrated as prior art.

In FIG. 1A, the print processing apparatus of vendor "C" receives the print jobs from workflow applications of vendors "A", "B", and "D". Here, the workflow applications have extended the respective JDFs. Therefore, there may be case where the print processing apparatus of vendor "C" cannot analyze and perform processing on the JDFs.

In order to correspond to the print jobs of the workflow applications, it is thought that the print processing apparatus of vendor "C" includes rendering engines which correspond to the JDF conversions and workflow applications (hereinafter "RIP engines").

Figure 1B:
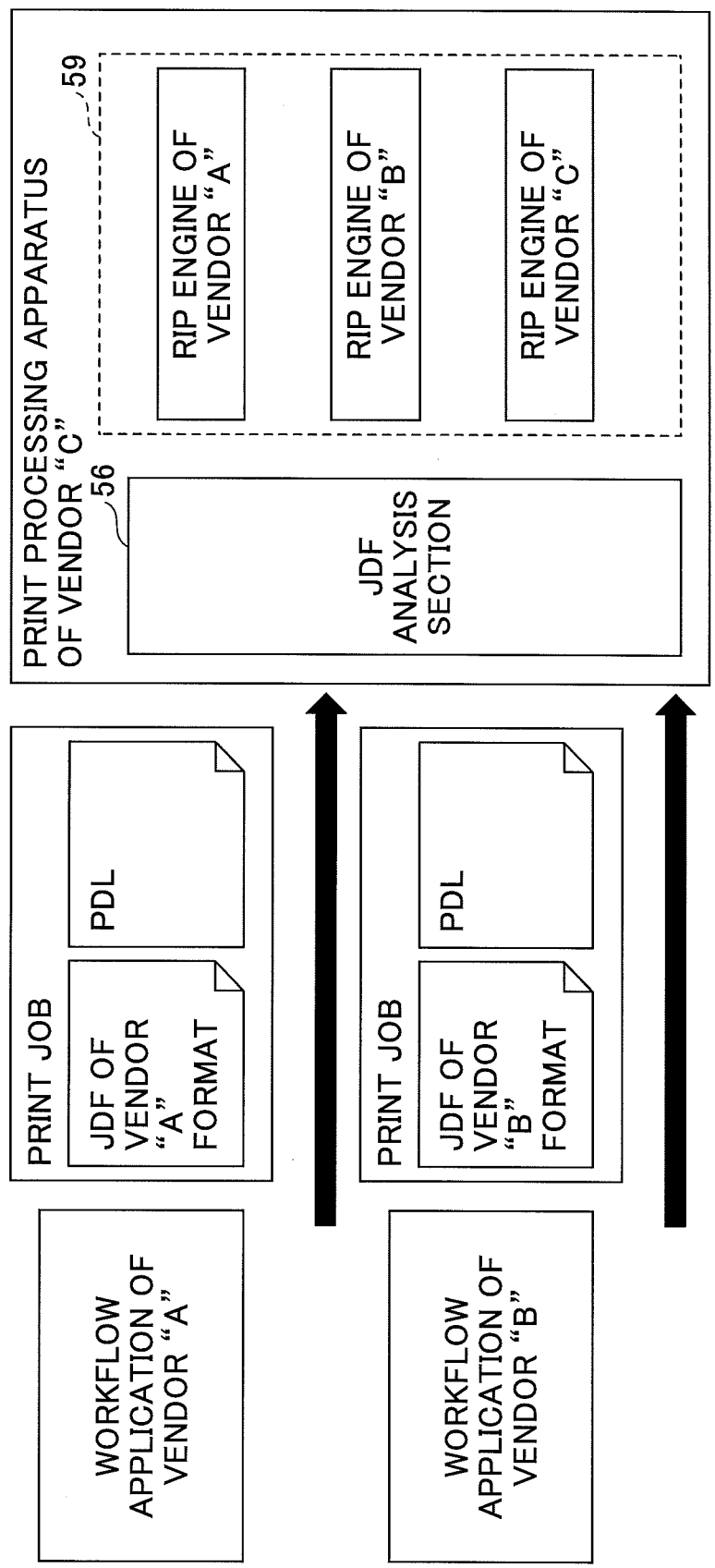

In FIG. 1B, a JDF analysis section analyzes the JDFs, determines the respective vendors (suppliers) of the workflow applications who generated the JDFs, and converts the JDFs into setting information the print processing apparatus of vendor "C" can handle.

Further, by having the RIP engines corresponding to the workflow applications, it becomes possible to perform the print jobs (print), which are generated by the workflow applications, in accordance with the user's intentions.

Therefore, even when the workflow applications extend the respective JDFs, it becomes possible for the print processing apparatus of vendor "C" to print the print jobs, which are generated by the workflow applications of the vendors "A", "B", and "D", in workmanship in accordance with the user's intentions.

On the other hand, there may be a case where a user would like to display and change the content of the print job before rendering the print job using the RIP engine. However, the attributes and the attribute values that can be set in the print job may differ among the RIP engines.

In this regard, for example, there may be a case where the print processing apparatus of the vendor "A" cannot correctly display the content of the print job of the print processing apparatus of the vendor "B" or "C". Further, there may be a case where a change to the attribute value that is effective only for the vendor "B" is wrongly accepted in the print job for the vendor "A".

For example, a case of collective printing is described. Here, it is assumed that the workflow application of the vendor "A" can select (accept) only one mode from among 2-UP (print two-page data in one page), 4-UP (print four-page data in one page), 9-UP (print nine-page data in one page), and 16-UP (print sixteen-page data in one page) modes.

On the other hand, it is assumed that the workflow application of the vendor "B" can select any of "M (No. of vertical pages)×N (No. of horizontal pages) (M: an integer greater than zero and less than or equal to an upper limit value, N: an integer greater than zero and less than or equal to an upper limit value)".

Further, it is assumed that the setting screens of the vendor "A" and "C" are the same as each other. Under the above assumptions, in a case where a job for the vendor "B" is displayed by the print processing apparatus of the vendor "C", it is possible for the print processing apparatus of the vendor "C" to display the collective printing in M×N=1×2, 2×2, 3×3, and 4×4 modes as 2-UP, 4-UP, 9-UP, or 16-UP modes, respectively. However, if the M×N is other than above modes, the print processing apparatus of the vendor "C" cannot correctly display the setting of the collective printing.

On the other hand, it is assumed that the setting screens of the vendor "C" and "B" are the same as each other. Under the above assumptions, in a case where a job for the vendor "A" is displayed by the print processing apparatus of the vendor "C", it is possible for the print processing apparatus of the vendor "C" to display any of the 2-UP, 4-UP, 9-UP, and 16-UP modes of the print job and accept the change into any of the combinations "M×N" modes as well. However, when the setting (M×N) of the collective printing after the change is other than 1×2 or M=N, the RIP engine of the vendor "A" cannot perform rendering because the RIP engine of the vendor "A" does not support such collective printing modes.

The present invention is made in light of the above problem, and may provide an information processing apparatus capable of displaying setting content of a print job.

In the following, embodiments of the present invention are described with reference to the accompanying drawings.

First Embodiment

Outline of Embodiment in Printing a Print Job

FIG. 2A illustrates an example where a Digital Front End (DFE) according to this embodiment prints a print job. The DFE in FIG. 2A corresponds to the print processing apparatus. As illustrated in FIG. 2A, a DFE 32 of a vendor "C" includes a JDF analysis section 56 that converts the JDFs generated by the vendors "A", "B", and "C" into setting information that can be handled by the DFE 32 of the vendor "C" ("DFE inside job attribute"). The DFE 32 of the vendor "C" further includes RIP engines of the respective vendors "A", "B", and "C".

The RIP engines have aptitudes for rendering (performing a drawing process) the print jobs generated for the RIP engines (capable of processing the print jobs). Therefore, the print job generated by the workflow application of the vendor "A" is assumed to be rendered by the RIP engine of the vendor "A".

Similarly, the print job generated by the workflow application of the vendor "B" is assumed to be rendered by the RIP engine of the vendor "B", and the print job generated by the workflow application of the vendor "C" is assumed to be rendered by the RIP engine of the vendor "C". Herein, note that the workflow application and the RIP engine of the vendor "X" refer to the workflow application and the RIP engine that are not only directly generated by the vendor "X" but also generated by a vendor other than vendor "X" for the vendor "X".

Further, a user interface (UI) control section 54 that displays a setting screen (an example of claimed "display screen") of the print job includes a vendor "A" UI control section 62a, a vendor "B" UI control section 62b, and a vendor "C" UI control section 62c, which corresponds to RIP engines 59 for the vendors "A", "B", and "C", respectively.

The JDF analysis section 56 analyzes the JDF included in the print job, and determines the vendor (the RIP engine) of workflow application that generated the JDF. The UI control section 54 acquires the determination result, and any one of the vendor "A" UI control section 62a, the vendor "B" UI control section 62b, and the vendor "C" UI control section 62c displays the setting screen of the print job.

By displaying the setting screen of the print job by corresponding to the RIP engines 59 of the vendors, it becomes possible for the DFE 32 to correctly display the setting content of the print jobs generated by the workflow applications of the vendors (in a manner so that the attributes and attribute values described in the JDFs by the applications are displayed in a manner in accordance with the intention of the respective applications).

Further, when the vendor "A" UI control section 62a, the vendor "B" UI control section 62b, or the vendor "C" UI control section 62c accepts the change of the print job, the vendor "A" UI control section 62a, the vendor "B" UI control section 62b, or the vendor "C" UI control section 62c accepts only the settings that can be rendered by the RIP engine of the vendor "A", "B", or "C", respectively, it becomes possible to prevent occurrence of inconvenience that the RIP engine 59 cannot perform rendering.

Example 1

Example Configuration

Figure 3:
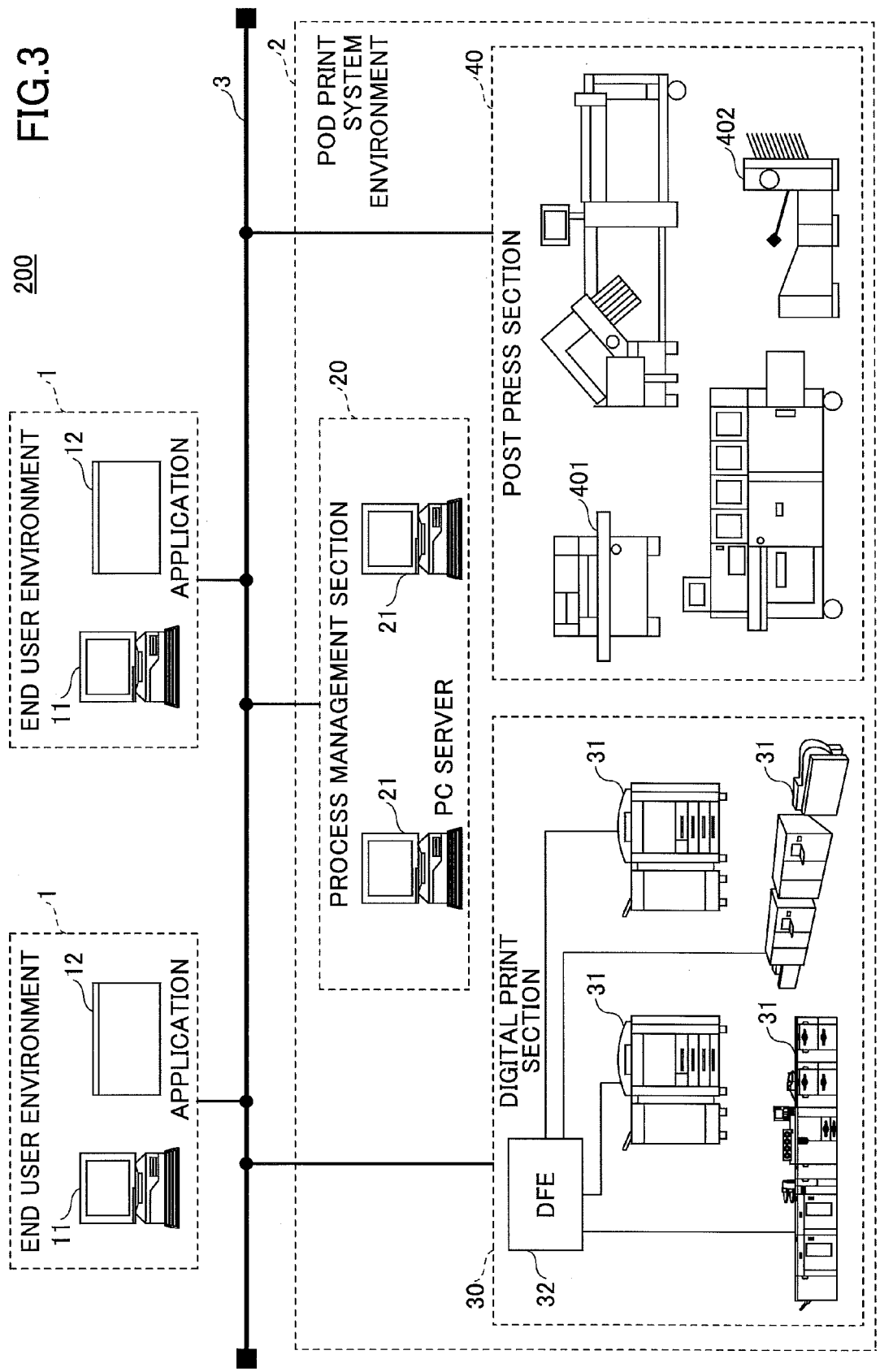
FIG. 3 is a drawing illustrating an example overall configuration of a print system.

FIG. 3 illustrates an example overall configuration of a print system 200 according this embodiment. The print system 200 according to this embodiment includes one or more end user environments 1 and a Print On Demand (POD) print system environment 2 which are connected to each other via a network 3.

The end user environment 1 includes a client personal computer (PC) 11. The client PC 11 includes a workflow application for POD print business purposes (hereinafter simplified as "application") 12, so that the application 12 can generate the print job based on a user's operation.

The application 12 can perform a collective print function to adhere plural logical page images on a sheet surface (Number-up printing function) and an image edit function to add a header, a footer, a page number, etc., to the sheet surface. Further, the application 12 can designate instructions to punch, staple, etc., for binding prints. Those instructions and setting are described in the JDF. The JDF may be referred to as a "job ticket", "operative instructions", "print instructions", etc.

The POD print system environment 2 includes a process management section 20, a digital print section 30, and a post press section 40, which are connected to each other via the network 3. The process management section 20 sends operational instructions to the digital print section 30 and the post press section 40 in the POD print system environment 2 and collectively manages the workflow of the POD print system environment 2.

The process management section 20 receives a print job (JDF and PDL) from the end user environment 1, and stores the print job. The JDF is an example of claimed "setting information". The PDL is an example of claimed "print data". Basically, the PDL refers to a language to construct drawing content of a page image (a rasterized image). However, the term "PDL" herein refers to data described in a PDL. As the "PDL", there are, for example, a Portable Document Format (PDF), Postscript, PCL, RPDL, etc.

Further, the process management section 20 can construct step operations as a workflow based on the print job from the end user environment 1, perform scheduling on the operations of the digital print section 30 and the post press section 40, and operators' operations, and notify an operator when an error occurs when necessary in automatic operation. Generally, the process management section 20 includes one or more PC servers 21.

The process management section 20 transmits the print job to the digital print section 30 to perform printing. Further, printed sheets (paper) are transmitted to the post press section 40, so that the post press section 40 performs processes such binding based on an instruction from the process management section 20. Further, the print job may be directly transmitted from the digital print section 30 to the post press section 40.

The digital print section 30 includes various printers 31 (printing apparatus such as, for example, a production oriented printer, a high-speed color inkjet printer, and a color/monochrome MultiFunction peripheral (MFP)). The digital print section 30 further includes a DFE 32. The DFE 32 may also be called the "print processing apparatus", and controls printing by the printers 31. The DFE 32 may be separated from the printers 31, or may be integrated into the printers 31.

Upon receiving the print job from the process management section 20, the DFE 32 generates raster data (an example of claimed "drawing data") based on the JDF and the PDL so that the printers 31 can form a toner image or an image with ink, and transmits the raster data to the printers 31.

As described above, the digital print section 30 includes various printers 31. The digital print section 30 may further include a printer 31 that is directly connected to a finisher (post-processing apparatus), which performs post processing (post fabrication work) such as creasing, saddle stitch binding, case working, punching, etc., on the printed recorded sheets.

The post press section 40 includes post processing devices such as a creasing device, a saddle stitching machine, a case working machine, a cutting machine, a mail inserter, a page setter, etc., in accordance with an operational instruction of printed sheets (post press job) received from the process management section 20.

Further, the post press section 40 performs a finishing process such as creasing, saddle stitch binding, case working, cutting, inserting, page setting, etc., on the printed sheets which are output from the digital print section 30. To that end, the post press section 40 includes post processing apparatuses to perform post processing (post fabrication work) after digital printing such as a stapler 401 and a punching machine 402.

An end user in the end user environment 1 uses the application 12 via the client PC 11 to send an instruction for editing an image, printing, inserting text, post processing, etc., and transmits the print job to the process management section 20 of the POD print system environment 2.

The PC server 21 of the process management section 20 sends a print instruction to the digital print section 30 based on the JDF, and sends an instruction for the post processing to the post press section 40.

Hardware Configuration

In this embodiment, the print job generated by the end user environment 1 is received by the process management section 20, and the process management section 20 transmits the print job to the DFE 32. The functions of the DFE 32 according to this embodiment may not be directly performed by the DFE 32 if a device on the network can perform functions. However, in this embodiment, it is assumed that the DFE 32 performs a process of converting the (PDL) specific command into the PDL-inside specific attributes and the common PDL.

Figure 4:
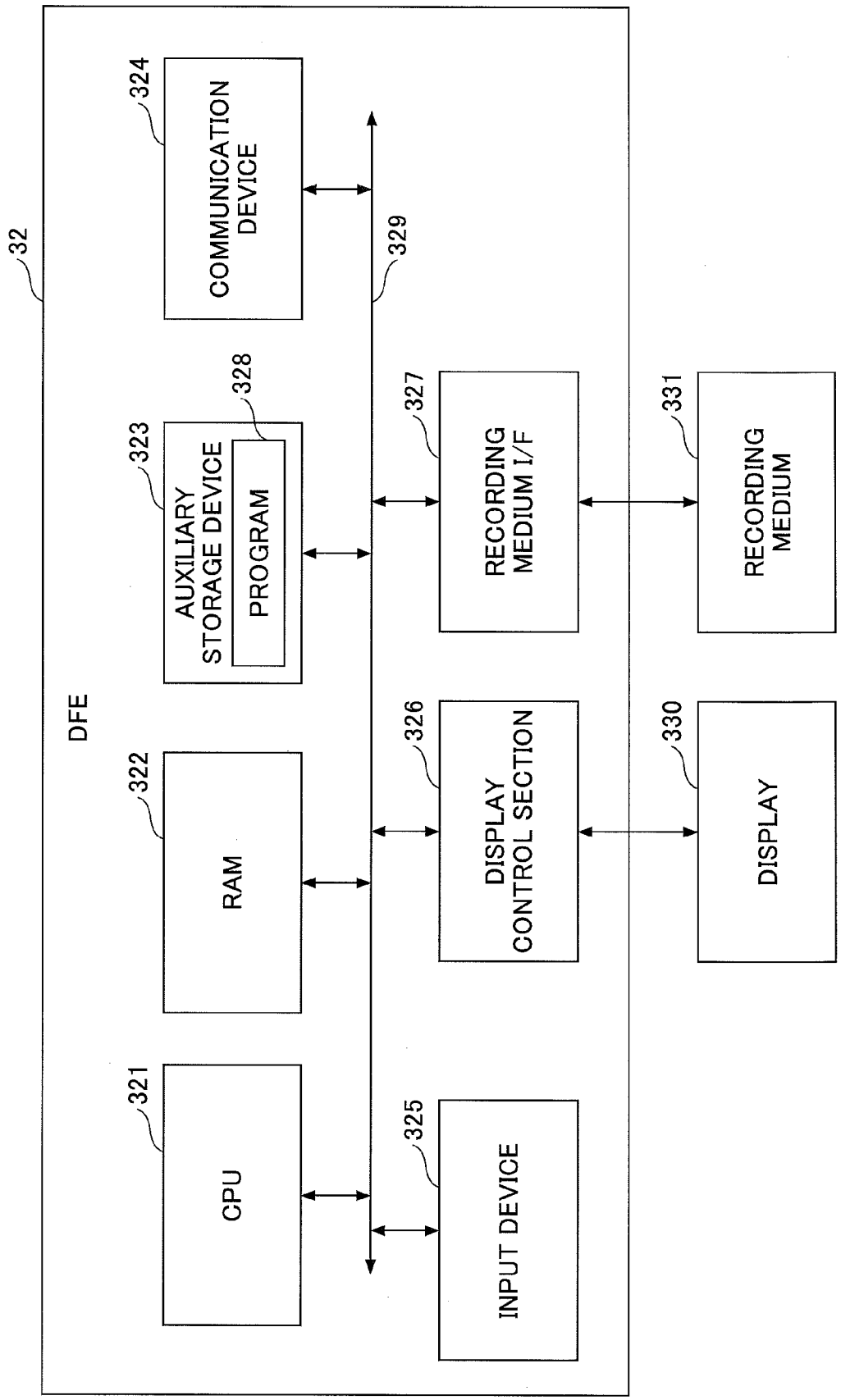
FIG. 4 is a drawing illustrating an example of a hardware configuration of the DFE.

FIG. 4 illustrates an example hardware configuration of the DFE 32. The DFE 32 can be realized by having, for example, the hardware configuration as illustrated in FIG. 4. Namely, the DFE 32 has the functions of an information processing apparatus (computer). The DFE 32 includes a Central Processing Unit (CPU) 321, a Random Access Memory (RAM) 322, an auxiliary storage device 323, a communication device 324, an input device 325, a display control section 326, and a recording medium interface (I/F) 327.

The CPU 321 controls the overall DFR 32 by executing a program using the RAM 322 as a working memory. The auxiliary storage device 323 is a non-volatile memory such as a hard Disk Drive (HDD) or a Solid State Drive (SSD). The auxiliary storage device 323 stores a program 328 which has a function of converting a print job.

The communication device 324 is a modem, a Local Area Network (LAN) card or the like to be connected to the network 3 to communicate with the end user environment 1, the process management section 20 or the post press section 40, and the printers 31. The input device 325 is a keyboard, a mouse and the like to receive user's operations. The display control section 326 is connected to a display 330, and causes the display 330 to display a screen based on an instruction from the CPU 321. The display 330 may include a touch panel.

The recording medium I/F 327 is provided in a manner so that a removable recording medium can be attached to and detached from the recording medium I/F 327. The recording medium I/F 327 reads data from a recording medium 331 and write data into the recording medium 331 based on the instructions from the CPU 321.

As the recording medium 331, various types of the recording media may be used including, for example, a medium recording optically, electrically, or magnetically such as a Compact Disc Read-Only Memory (CD-ROM), an optical disk, a Universal Serial Bus (USB) memory, a SD card (registered trademark), etc., or a semiconductor memory electrically recording information such as a flash memory, etc.

Further, the program 328 is distributed via a recording medium with the program 328 stored therein or may be downloaded via the network 3 from a server (not shown).

Further, the client PC 11 of the end user environment 1 and the PC server 21 of the process management section 20 may also have a hardware configuration similar to that as described in FIG. 4.

Functions of the DFE 32

Figure 5:
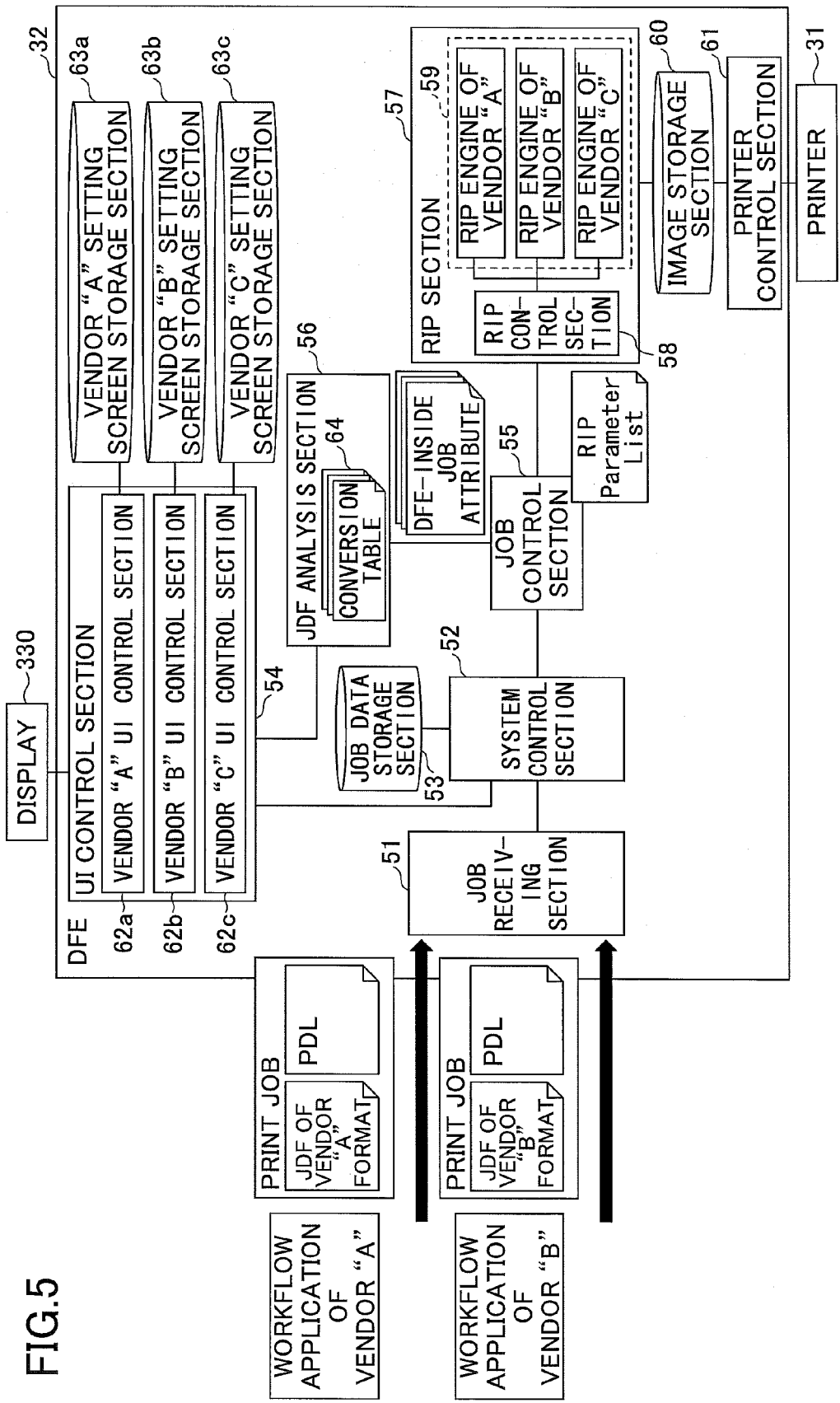
FIG. 5 is a drawing illustrating an example functional block diagram of the DFE.

FIG. 5 illustrates an example functional block diagram of the DFE 32. In a print workflow, the DFE 32 performs job control, Raster Image Processor (RIP) control, and printer control. Namely, the DFE 32 functions as a server that provides main print functions to the end user environment 1 and the process management section 20. Here, the job control refers to a series of control in a procedure of a print job including receipt of a print job, analysis of the JDF, generation of the raster data, printing by a printer, etc. The RIP control herein refers to the control of generating the "RIP Parameter List" to cause the RIP engine 59 to generate the raster data after the generation of the "DFE inside job attribute".

The "RIP" stands for "Raster Image Processor", and refers to a dedicated Integrated Circuit (IC) for generating the raster data or the generation of the raster data. The printer control is control of transmitting the raster data and a part of "DFE inside job attribute" ("Finishing information" described below) to the printer for printing.

The DFE 32 includes a job receiving section 51, a system control section 52, a user interface (UI) control section 54, a job control section 55, the JDF analysis section 56, a RIP section 57, a RIP control section 58, a RIP engine 59, and a printer control section 61. These elements can be realized when the CPU 321 executes the program 328 and various hardware elements of FIG. 4, etc., work together. The DFE 32 further includes a job data storage section 53 and an image storage section 60 that are formed of the auxiliary storage device 323, the RAM 322, the recording medium 331, etc.

The job receiving section 51 receives the print job from the application 12, etc., via the network 3. As the logs, a unique job number, received day and time, finished day and time, a status, etc., are stored in association with the print job. The print job is input from the application 12 but may be input via the USB memory, etc. In this embodiment, it is assumed that the JDF is included in the print job. However, when the JDF is not included in the print job, the job receiving section 51 may generate a dummy JDF to make it possible to perform rendering.

The system control section 52 stores the received print job into the job data storage section 53 or outputs the received print job to the job control section 55. For example, in a case where it is determined that a print job is to be stored in the job data storage section 53 of the DFE 32, the system control section 52 stores the received print job into the job data storage section 53. Further, in a case where, in the JDF, the information is described whether to be stored into the job data storage section 53, the system control section 52 follows the described information.

Further, when, for example, a user performs an operation to display the content of the print job stored in the job data storage section 53, the system control section 52 outputs the JDF from the job data storage section 53 to the UI control section 54. The UI control section 54 outputs the JDF to the JDF analysis section 56, so as to acquire a determination result indicating that the JDF is generated for which of the RIP engines (i.e., which application has generated the JDF). Based on the acquired determination result, any one of the vendor "A" UI control section 62a, the vendor "B" UI control section 62b, and the vendor "C" UI control section 62c displays the JDF on the setting screen of the printing. By doing this, the print job is displayed.

The vendor "A" UI control section 62a includes a vendor "A" setting screen storage section 63a, the vendor "B" UI control section 62b includes a vendor "B" setting screen storage section 63b, and the vendor "C" UI control section 62c include a vendor "C" setting screen storage section 63c.

The vendor "A" setting screen storage section 63a stores a setting screen on which the attribute values of the JDF, which is generated by the application 12 for the RIP engine of the vendor "A" (hereinafter may be referred to as "vendor "A" RIP engine"), are displayed in a manner in accordance with the intention of the application 12 and which accepts settings of attribute values that can be rendered by the vendor "A" RIP engine.

Similarly, the vendor "B" setting screen storage section 63b stores a setting screen on which the attribute values of the JDF, which is generated by the application 12 for the RIP engine of the vendor "B" ("vendor "B" RIP engine"), are displayed in a manner in accordance with the intention of the application 12 and which accepts settings of attribute values that can be rendered by the vendor "B" RIP engine.

Further, the vendor "C" setting screen storage section 63c stores a setting screen on which the attribute values of the JDF, which is generated by the application 12 for the RIP engine of the vendor "C" ("vendor "C" RIP engine"), are displayed in a manner in accordance with the intention of the application 12 and which accepts settings of attribute values that can be rendered by the vendor "C" RIP engine.

When a user changes the JDF, the vendor "A" UI control section 62a, the vendor "B" UI control section 62b, or the vendor "C" UI control section 62c accepts the content change, so that the system control section 52 stores the changed JDF into the job data storage section 53.

Further, upon receiving an instruction to perform the print job from a user, the end user environment 1, or the process management section 20, the system control section 52 outputs the print job stored in the job data storage section 53 to the job control section 55. Further, for example, in a case where print time is set in the JDF, the system control section 52 outputs the print job stored in the job data storage section 53 to the job control section 55 at the print time.

The job data storage section 53 is a storage area to store the print job as described above, and is formed in the auxiliary storage device 323 of the DFE 32 or in the recording medium 331. The job data storage section 53 may be formed (provided) in a storage device (not shown) on a network.

As described above the UI control section 54 interprets the JDF and displays the content of the print job on the display 330 (besides the JDF, bibliographic items such as a request person and request date and time of the print job may also be included). Further, the UI control section 54 can display the raster data, which are generated by the RIP engine 59, on the display 330.

The job control section 55 causes the RIP control section 58 to generate the raster data, and causes the printer control section 61 to perform printing. Specifically, first, the job control section 55 transmits the JDF of the print job to the JDF analysis section 56, and outputs a JDF conversion request to convert the JDF to the JDF analysis section 56.

The JDF analysis section 56 acquires the JDF and the JDF conversion request from the job control section 55. The JDF analysis section 56 interprets the description of the JDF and determines the vendor (supplier) of the application 12 having generated the JDF. Here, the determination of the vendor of the application 12 having generated the JDF is substantially equivalent to the determination of the rendering engine by which it is assumed that the print job is rendered.

The JDF analysis section 56 converts the JDF into the "DFE inside job attribute" that can be handled by the DFE 32 based on a method using a conversion table 64 provided by a vendor of the application 12 basis. Namely, regarding the DFE 32 generated by the vendor "C", the JDF analysis section 56 converts not only the JDF generated by the application of the vendor "C" but also the JDF generated by the application of the vendor "B" or "C" into the "DFE inside job attribute" that is handled by the DFE 32 of the vendor "C".

Further, when generating the "DFE inside job attribute", the JDF analysis section 56 sets the "RIP control mode" to the "DFE inside job attribute". Details of the "RIP control mode" are described below. The "RIP control mode" includes a "Page Mode" and a "Sheet Mode".

Here, it is assumed that which of the "Page Mode" and a "Sheet Mode" corresponds to the print job is known in advance. Therefore, when the vendor of the workflow application that generated the JDF is determined, it is also possible to determine the "RIP control mode". In this embodiment, it is assumed that the DFE 32 recognizes that the setting of the collective printing of the print job is "page Mode" (i.e., the default is "Page Mode").

The job control section 55 that acquires the "DFE inside job attribute" as described above converts the "DFE inside job attribute" and the PDL into the "RIP Parameter List", and outputs the print job in the form of the "RIP Parameter List" to the RIP control section 58. The "RIP Parameter List" is a set of information necessary to perform a RIP process in the RIP engine 59. The job control section 55 determines an instruction of the RIP process to the RIP engine 59 based on the information of the "RIP Parameter List".

The "RIP Parameter List" also includes the "RIP control mode". The RIP control section 58 controls the RIP engine 59 in accordance with the "RIP control mode". Accordingly, the sequence is determined based on the "RIP mode".

The "Page Mode" refers to a mode in which the RIP process is operated on a page basis and raster data collected into one page is generated. The "Sheet Mode" refers to a mode in which the RIP process is performed on each part (corresponding to one page before having been collected) in one page where plural pages are already collected and the raster data are generated.

The RIP section 57 includes the RIP control section 58 and the RIP engine 59, and generates the raster data by using the RIP control section 58 and the RIP engine 59. The RIP control section 58 analyzes the information of the "RIP Parameter List", and determines the RIP engine 59 to be used from among plural RIP engines 59. The determination of the RIP engine 59 may be based on one or more items of the "RIP Parameter List" or may be based on the RIP engine identification information explicitly described in the "RIP Parameter List".

For example, the RIP engine 59 is determined based on the description "xmlns:A="www.aaa.com/schema/aaa" or "xmlns:B="www.bbb.com/schema/bbb" in the "RIP Parameter List". Further, when the job control section 55 explicitly describes the RIP engine identification information in the "RIP Parameter List", the RIP control section 58 selects the RIP engine that is indicated in the RIP engine identification information. The RIP control section 58 refers to the "RIP Parameter List", and transmits the RIP command to the selected RIP engine 59.

Further, the RIP control section 58 refers to the "RIP Parameter List". When the "RIP control mode" is the "Sheet Mode", the RIP control section 58 outputs the RIP command, in accordance with the "Sheet Mode", to the RIP engine 59. By doing this, the difference in print jobs can be overcome (compensated for).

The RIP engine 59 is a rendering engine to generate raster data by performing rasterization based on the RIP commands.

The image storage section 60 is a storage means to store the generated raster data. The image storage section 60 is mounted in, for example, the auxiliary storage device 323. The image storage section 60 may be mounted in a storage device on a network.

The printer control section 61 is connected to the printers 31, so that printing is performed by reading the raster data stored in the image storage section 60 and transmitting the raster data to the printers 31. Further, the printer control section 61 performs the finishing process based on the "Finishing information" acquired from the job control section 55.

Determination of JDF and Vendor of the Application Having Generated JDF

The JDF is described in Extensible Markup Language (XML). The XML is a standard of a structured text to structure a document by adding meanings to tags.

FIGS. 6A through 6C illustrate examples of parts of JDF descriptions. It is assumed that the JDF in FIG. 6A is generated by the application 12 of the vendor "C". In JDF, a content of the instruction to a print job is described.

The description "JDF xmlns="http://eee.CIP4.org/JDF-SChema_1_1"" denotes the CIF4-compliance JDF ticket.

The description "xmlns:C="www.ccc.com/schema/ccc"" denotes a definition of an extended JDF tag in which a print supplier/vendor who is not CIF4-compliant has been uniquely extended. In this example, all the tags which start from "C:" in the JDF are the extended tags.

The description "ResourcePool" defines a set of attributes to realize printing.

The description "LayoutPrepareationParama" is one of the attribute defined in the "ResourcePool", and defines attributes related to printing.

The description "ResourceLinkPool" defines a set of references to the attributes commonly used in the "ResourcePool" corresponding to a specific range when attributes differ in the specific range such as between pages in a job.

The description "ComponentLink" is one definition of references in the "ResourceLinkPool", and designates the reference of attributes related to outputs and the information of the outputs.

The description "Amount" designates the number of prints.

The description "Rotate" designates the rotation angle of an image.

FIG. 6B illustrates an example of the JDF of vendor "A" and extended definition. FIG. 6C illustrates an example of the JDF of vendor "B" and extended definition. As the description "xmlns:A="www.aaa.co,/schema/aaa"" in FIG. 6B, all the tags which start from "A:" are extended tags of the vendor "A". Similarly, as the description "xmlns:B="www.bbb.co,/schema/bbb"" in FIG. 6C, all the tags which start from "B:" are extended tags of the vendor "B".

Therefore, by referring to those descriptions in the JDF, the JDF analysis section 56 can identify the vendor of the application 12 (RIP engine) that generated the JDF. In accordance with the vendors of the applications 12, by using the conversion table 64, the JDF can be converted into the "DFE inside job attribute" that can be handled by the DFE 32 of the vendor "C".

Further, upon acquiring the JDF from the UI control section 54, the JDF analysis section 56 refers to the extended tags and determines the RIP engine 59.

Generation of the DFE Inside Job Attribute

Figure 8A:
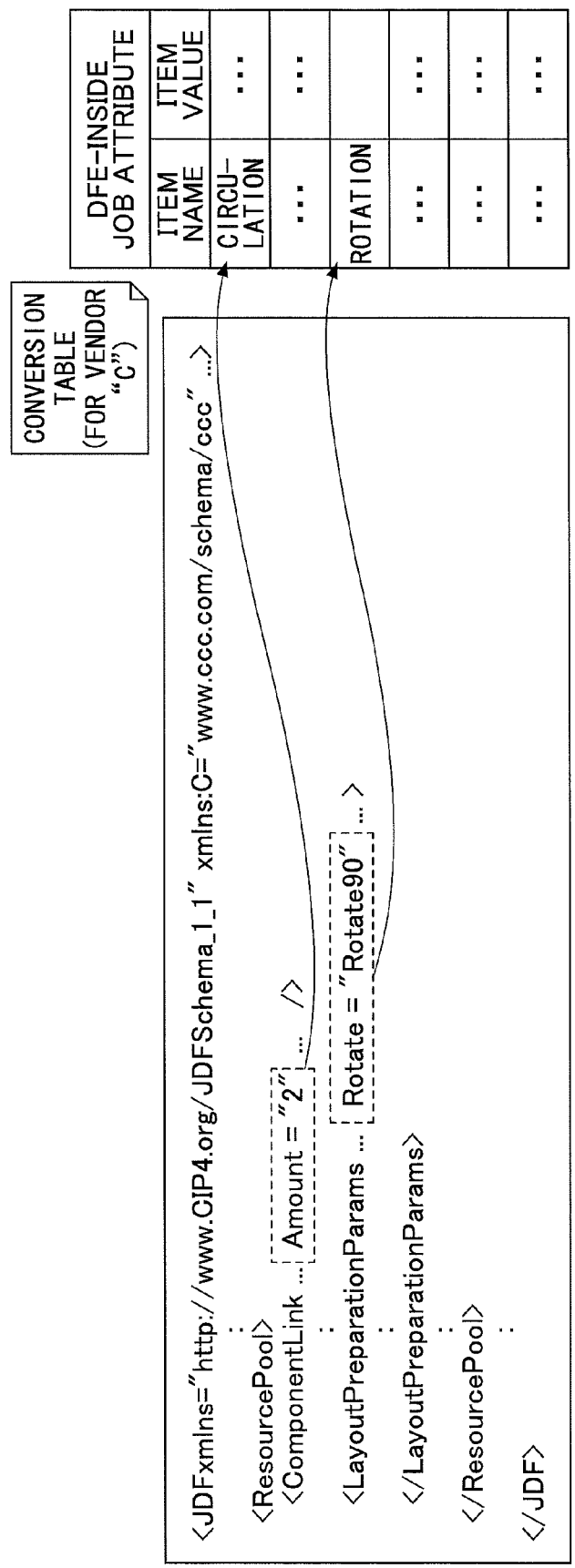
Figure 8B:
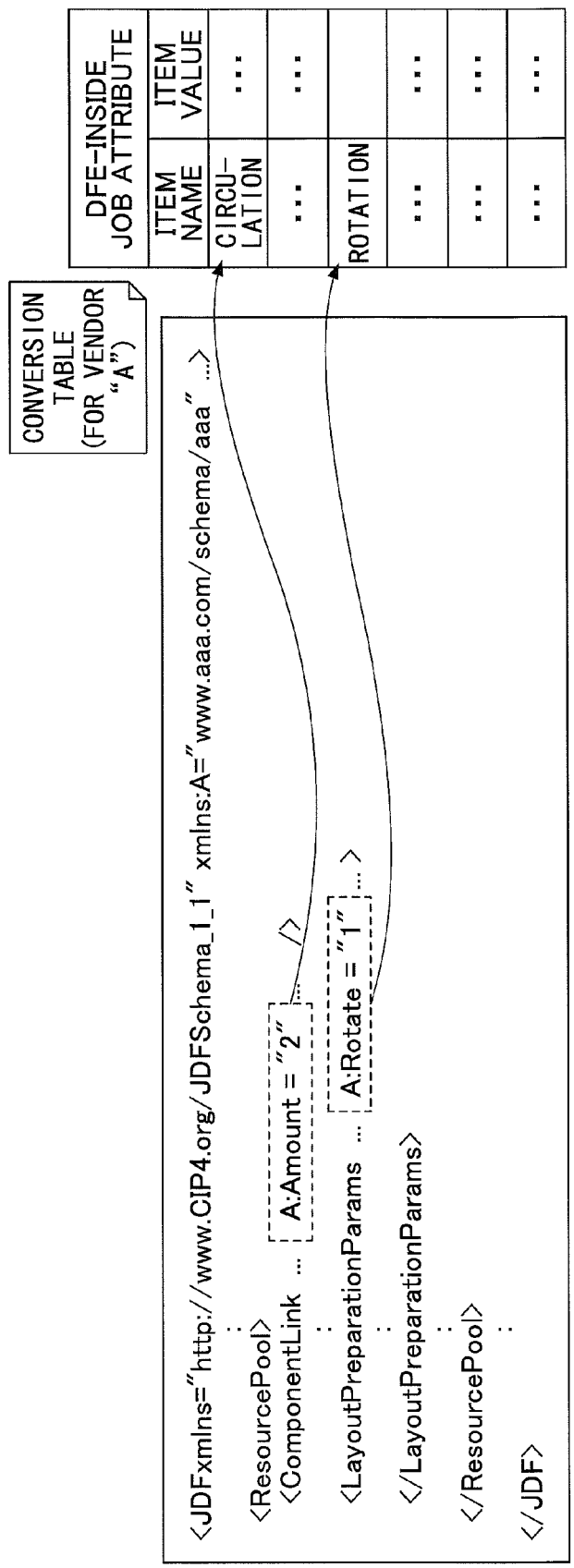

The generation of the "DFE inside job attribute" is described with reference to FIGS. 7A through 8C. FIGS. 7A through 7C illustrate an example of the conversion tables. FIGS. 8A through 8C illustrate an example of the generation of the "DFE inside job attribute".

The JDF analysis section 56 converts the JDF into the "DFE inside job attribute" by using the conversion table 64 of the vendor of the application 12 that generated the JDF. When it is not possible to determine the vendor of the application 12 that generated the JDF, the JDF is converted into the "DFE inside job attribute" by using all the conversion tables. In this case, the "DFE inside job attributes" corresponding to all the RIP engines are generated.

FIG. 7A illustrates an example conversion table for the vendor "C". In the conversion table 64 for the vendor "C", the attribute value of the attribution name called "Amount" corresponds to the item value of the item name called "circulation", and the attribute value of the attribution name called "Rotate" corresponds to the item value of the item name called "Rotation".

As the conversion method, as illustrated in FIGS. 8A through 8C, the conversion table 64 in which the attribute in tag of the JDF corresponds to the item of the "DFE inside job attribute" is referred to, and the corresponding attribute value of the JDF is allocated as the item value of the "DFE inside job attribute".

The JDF analysis section 56 stores in advance not only the conversion table for the vendor "C" but also the conversion tables for the vendors "A" and "B". FIGS. 7B and 7C illustrate the conversion tables 64 for the vendors "B" and "C", respectively. The JDF analysis section 56 detects the description designating the extended tag from the JDF as describe above, determines the vendor of the application, and uses the conversion table 64 corresponding to the vendors.

In the cases of the JDFs of the vendors "A" and "B", the conversion can be performed in the same manner. In the conversion table 64 for the vendor "A", the attribute value of the attribution name called "A:Amount" corresponds to the item value of the item name called "circulation", and the attribute value of the attribution name called "A:Rotate" corresponds to the item value of the item name called "Rotation".

In the conversion table 64 for the vendor "B", the attribute value of the attribution name called "B:DeliveryAmount" corresponds to the item value of the item name called "circulation", and the attribute value of the attribution name called "B:Rotate" corresponds to the item value of the item name called "Rotation".

Further, in the conversion table 64 for the vendor "B", only when the attribute value of the attribute name called "B:AlternateRotation" is "false", the rotation becomes effective. Therefore, when it is determined that the JDF of the vendor "A" or "B", the "DFE inside job attribute" can be generated similar to the case of the JDF for the vendor "C".

When it is determined that the format of the print job in the collective printing is generated by the application 12 of the vendor other than the own vendor (vendor "C"), the JDF analysis section 56 sets the "Sheet Mode" to the item of the "RIP control mode" of the "DFE inside job attribute".

On the other hand, when it is determined that the application 12 is generated by the own vendor (vendor "C") or the format of the print job in the collective printing is generated by the application 12 of the same vendor (vendor "C"), the JDF analysis section 56 sets the "Page Mode" to the item of the "RIP control mode" of the "DFE inside job attribute". By doing this, the RIP control section 58 can control the RIP command to be output to the RIP engine 59 in accordance with the "RIP control mode".

FIG. 9 illustrates an example of the "DFE inside job attribute". The "DFE inside job attribute" is mainly divided into "job information" which is related to job execution, "Edit information" which is related to the raster data, and "Finishing information" which is related to the finishing process.

The Job information includes an item "circulation" which designates the circulation.

An item "direction information" in the "Edit information" designates a printing direction.

An item "print surface information" in the "Edit information" designates a print surface.

An item "rotation" in the "Edit information" designates a rotation angle of a page.

An item "enlarge/reduce" in the "Edit information" designates enlarge or reduce and a magnification ratio.

An item "image position: offset" in the "Edit information" designates an offset of an image.

An item "image position: positional adjustment information" in the "Edit information" designates a positional adjustment of an image.

An item "layout information: custom imposition layout" in the "Edit information" designates the layout of a custom surface.

An item "layout information: No. of pages" in the "Edit information" designates the number of pages for sheets of paper.

An item "layout information: imposition information" in the "Edit information" designates the information related to a surface arrangement.

An item "layout information: page order information" in the "Edit information" designates the information related to an order of pages to be printed.

An item "layout information: creep position adjustment" in the "Edit information" designates the information related to an adjustment of a creep position.

An item "margin information" in the "Edit information" designates the information related to a margin for a fit box and a gutter.

An item "crop mark information: center crop mark information" in the "Edit information" designates the information related to a center crop mark information.

An item "crop mark information: corner crop mark information" in the "Edit information" designates the information related to corner crop mark information.

An item "Collate information" in the "Finishing information" designates the information indicating whether to print on a page basis or on a document basis when multiple copies of a document are printed.

An item "stapling/binding information" in the "Finishing information" designates the information related to stapling/binding.

An item "punching information" in the "Finishing information" designates the information related to punching.

An item "creasing information" in the "Finishing information" designates the information related to creasing.

An item "trimming" in the "Finishing information" designates the information relate to trimming.

An item "output tray information" in the "Finishing information" designates the information related to an output tray information.

An item "input tray" in the "Finishing information" designates the information related to an input tray.

An item "cover sheet information" in the "Finishing information" designates the information related to a cover sheet.

Further, as illustrated in FIG. 9, in the "DFE inside job attribute", the "RIP control mode" is set. As the "RIP control mode", the "Page Mode" or the "Sheet Mode" is set. In a case of a dummy JDF, it is assumed that the "Page Mode" is set as the "RIP control mode".

RIP Parameter List

FIG. 10 illustrates an example of the "RIP Parameter List".

An item "input/output data type information" designates a type of input/output data (the input/output data are designated in not only PDL but also a text file, an image data such as in JPEG, etc.).

An item "input/output data read/write position designation method information" designates a designation method of designating an offset of input/output data (read/write position). For example, it is possible to designate as "from designated position", "from the current position", "from the end", etc.

An item "input/output data read/write positional information" designates the current processing position of the input/output data.

An item "input/output data read/write execution mode information" is the information which designates an execution mode. For example, "READ", "WRITE", "READ_WRITE", etc., is set.

An item "unit information (dimension)" designates the unit used in the "RIP Parameter List". For example, a unit such as "mm", "inch", "pel", "point", etc., is designated.

An item "input/output data compression method information" designates a compression method of input/output data. For example, "UNCOMPRESSED", "PACKBITS", etc., is designated.

An item "RIP control mode" designates a control mode in collective printing. For example, the "Page Mode" or the "Sheet Mode" is designated.

An item "input/output image information section" includes items "information related to output image", "information related to input image", and "information related to handling of an image".

An item "image format type" designates a format type of an output image. For example, a type "raster" is designated.

An item "image format dimension" designates the dimensions of an output image format.

An item "image format resolution" designates the resolution of an output image format.

An item "image position" designates the position of an output image.

An item "color separation information" designates color separation (color decomposition). For example, "k", "cmyk", "separation", etc., is designated.

An item "color plane fit policy information" designates a development method of a color plane.

An item "plane shift information" designates a shift amount of a color plane.

An item "image format color bit number" designates the color bit number of an output image format.

An item "image direction information" designates a direction of a page of an output image.

An item "imaging positional information" designates a positional information of a crop area.

An item "imaging size information" designates size information of the crop area.

An item "imaging method information" designates a clipping policy.

An item "color ICC information" designates the information related to a color ICC profile.

An item "font substitution information" designates the information related to substitution of a font.

An item "imaging base point information" designates an imaging original point. For example, "center", "right-upper", etc., is designated.

An item "flat K black information" designates the information related to flat K black.

An item "rendering information" designates the information related to rendering (rasterizing).

An item "image format type" designates a format type of an input image. For example, "raster", etc., is designated.

An item "image format dimension" designates the dimension of a input image format.

An item "image format resolution" designates the resolution of the input image format.

An item "image position" designates the position of an input image.

An item "input data" designates the input data.

An item "page range information" designates a page number.

An item "color ICC information" designates the information related to color ICC profile.

An item "scaling offset information" designates an offset of an enlarging/reducing algorithm. For example, "horizontal direction offset", "vertical direction offset", etc., is designated.

An item "object area information" designates the width and the height of an object area.

An item "halftone information" designates an offset of a half tone. For example, "horizontal direction offset", "vertical direction offset", etc., is designated.

An item "scaling algorithm information" designates a scaling method.

An item "information related to the PDL" designates a data area, size information, and data layout method.

An item "data area" designates the area information stored in the PDL. Font information, information of the number of pages, etc., are included in the PDL that exists in the data area.

An item "size information" designates the size of the PDL.

An item "data layout method" designates the layout method of data. For example, "little endian", "big endian", etc., is designated.

Display Example of Setting Screen by UI Control Section

Here, an example setting screen displayed by the vendor "A" UI control section 62a and the vendor "B" UI control section 62b is described. In the setting screen displayed by the vendor "A" UI control section 62a, the attributes and the attribute values, which are described by the application 12 of the vendor "A" in the JDF, are displayed in a manner in accordance with the intention of the application 12. Further, in the setting screen displayed by the vendor "A" UI control section 62*a*, the attribute values that can be rendered by the vendor "A" RIP engine in a manner such that the attribute values can be settable.

FIG. 11A illustrates an example of the setting screen that is displayed on the display 330 by the vendor "A" UI control section 62*a*. FIG. 11B illustrates an example JDF that is generated by the application 12 of the vendor "A". The display 330 is an example of the claimed "display part". The "A:numberUP" of the tag "LayoutPreparationProgram" indicates that this JDF corresponds to the setting of the collective printing of the JDF in the extended setting of the vendor "A". Further, the attribute value "22" indicates the 4-UP collective printing (an example of the claimed "collective mode(s)").

The vendor "A" UI control section 62*a* determines that the attribute value "22" indicates "4-UP" based on the determination result that the JDF is for the vendor "A" RIP engine. Then, the vendor "A" RIP engine displays the corresponding setting value "4-UP" in a setting item called "collective printing setting" 501.

By doing this, as illustrated in FIG. 11A, the "4-UP" is displayed in the setting item "collective printing setting" 501. The vendor "A" UI control section 62*a* can set (select) not only "4-UP" but also "1-UP", "2-UP", "9-UP" and "16-Up" as the "collect printing setting" on which the vendor "A" RIP engine performs collective printing. Therefore, those setting values (i.e., "1-UP", "2-UP", "9-UP", and "16-Up") are included in advance to be displayed.

Further, the attribute values "11", "12", "33", and "44" are converted into the values "1-UP", "2-UP", "9-UP" and "16-Up", respectively, and displayed. Those values are displayed to be selected.

Further, when the setting "4-UP" is changed into the setting "1-UP", "2-UP", "9-UP", or "16-Up", the attribute value "22" corresponding to "4-UP" is changed into the attribute value "11", "12", "33", or "44", respectively, so that the JDF is updated.

Further, as a setting item "page order 502 in the collective printing performed by the vendor "A" RIP engine, the vendor "A" UI control section 62*a* has selectable settings "from left to right, from up to down", "from left to right, from down to up", "from right to left, from up to down", "from right to left, from down to up", "from up to down, from left to right", "from up to down, from right to left", "from down to up, from left to right", and "from down to up, from right to left". The vendor "A" UI control section 62*a* stores the setting screen and those selectable settings in advance, so as to accept the change by a user.

Figures 12A, 12B:
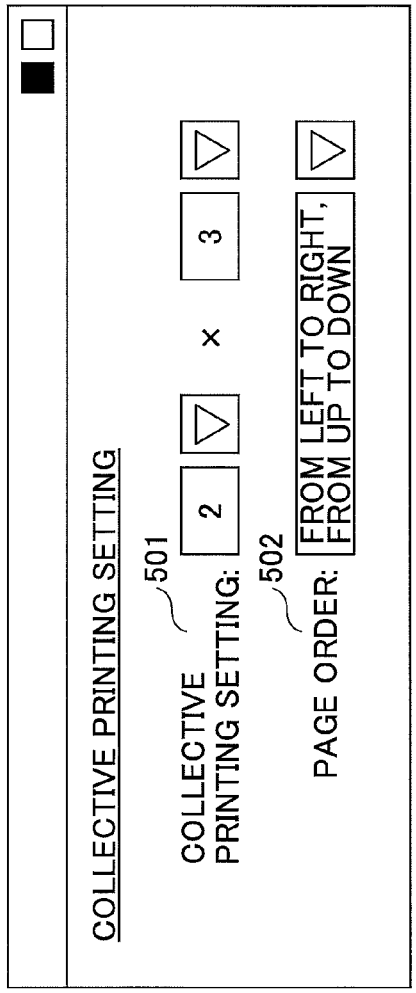
FIG. 12A is a drawing illustrating an example setting screen displayed by a user interface (U/I) control section of a vendor "B"
FIG. 12B is a drawing illustrating an example of the JDF generated by an application of the vendor "B"

FIG. 12A illustrates an example of the setting screen that is displayed on the display 330 by the vendor "B" UI control section 62*b*. FIG. 12B illustrates an example JDF that is generated by the application 12 of the vendor "B". The "B:numberUP" of the tag "LayoutPreparationProgram" indicates that this JDF corresponds to the setting of the collective printing of the JDF in the extended setting of the vendor "B". Further, the attribute value "23" indicates the "2×3" collective printing.

The vendor "B" UI control section 62*b* determines that the attribute value "23" indicates "2×3" based on the determination result that the JDF is for the vendor "B" RIP engine. Then, the vendor "B" RIP engine displays the corresponding setting values "2" and "3" in the setting item "collective printing setting" 501.

By doing this, as illustrated in FIG. 12A, the attribute values "2" and "3" are displayed in the setting item called "collective printing setting" 501. Here, the vendor "B" UI control section 62*b* can select the settings consisting of combinations of the vertical value ("M" (No. of pages in the vertical direction): 1-5) and the horizontal value ("N" (No. of pages in the horizontal direction): 1-5) ("M" and "N" can be set independently) as the "collective printing setting" on which the vendor "B" RIP engine can perform collective printing.

Therefore, those setting values (i.e., combinations of "M": 1-5 and "N" 1-5) are included in advance to be displayed. Further, the attribute value "M" and "N" of the "MN" are converted and displayed on the left side (indicating a collective number in the vertical direction) and on the right side (indicating the collective number in the horizontal direction), respectively, of the in the setting item "collective printing setting" 501. When the setting value "M" or "N" in the setting item "collective printing setting" 501 is changed, the attribute value "MN" of the JDF is updated.

Further, as a setting item "page order 502 in the collective printing performed by the vendor "B" RIP engine, the vendor "B" UI control section 62*b* has selectable settings "from left to right, from up to down", "from right to left, from up to down", "from up to down, from left to right", and "from up to down, from right to left". The vendor "B" UI control section 62*b* stores the setting screen and those selectable settings in advance.

Therefore, it becomes possible for the vendor "A" UI control section 62*a* to correctly display the JDF that is generated by the application 12 of the vendor "A" (i.e., display the attributes and attribute values described in the JDF generated by the application 12 in a manner in accordance with the intention of the application 12), and it becomes possible for the vendor "B" UI control section 62*b* to correctly display the JDF that is generated by the application 12 of the vendor "B". Further, a user can set the attribute values within the respective settable ranges corresponding to (supported by) the RIP engines 59. Accordingly, a user can change the attribute values only within the ranges in which the vendor "A" RIP engine or the vendor "B" RIP engine can perform rendering.

Further, the description of the setting screen displayed by the vendor "C" UI control section 62*c* is herein omitted. However, similar to the above, the vendor "C" UI control section 62*c* can correctly display the JDF generated by the application 12 of the vendor "A" and change the attribute values only within ranges where the vendor "C" RIP engine can perform rendering on the print jobs.

Unit Setting

Regarding the unit systems which are used by the applications 12 of the vendors, it is also possible for the vendor "A" UI control section 62*a* and the vendor "B" UI control section 62*b* to display the setting screens by using the unit systems that are adopted by the respective applications 12. For example, there may be a case where an application 12 which adopts "mm" as the unit system and another application 12 adopts "points" as the unit system.

In this case, even when the "mm" and "points" are converted to each other, it is not possible to always correctly convert to each other because an error may occur. Further, in order to perform accurate conversion with some degree of accuracy, it is desired to use several digits (typically 4 or 5 digits) of data including a decimal point therein. Therefore, the operability may be degraded.

In this embodiment, however, the vendor "A" UI control section 62*a*, the vendor "B" UI control section 62*b*, and the vendor "C" UI control section 62*c* display setting screens using the unit systems adapted by the respective applications 12. Therefore, it becomes possible to prevent the occurrence of errors and a series of figures as a result of the conversion.

Figures 13A, 13B:
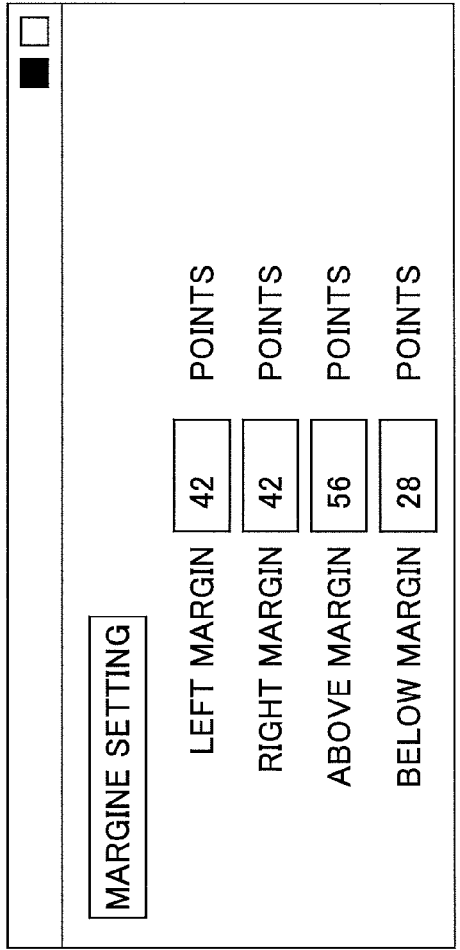
FIG. 13A is a drawing illustrating another example setting screen displayed by a user interface (U/I) control section of the vendor "A"
FIG. 13B is a drawing illustrating another example of the JDF generated by an application of the vendor "A"

FIG. 13A illustrates an example setting screen displayed by the vendor "A" UI control section 62a, and FIG. 13B illustrates an example JDF generated by the application 12 of the vendor "A". In FIG. 13B, the "A:LeftMargin" of the "ImagepositionPreparationparams" tag indicates that this JDF is generated by the application 12 of the vendor "A".

Further, the attribute value "42" (on the top) indicates that "42" points of offset is formed on the left side of image position (an example of the claimed "printing positions") by the JDF of the vendor "A". Similarly the other attribute values "42" (at the second top), "56", and "28" indicate that "42", "56", and "28" points of offsets are formed on the right, upper, and lower, respectively, sides of the image position by the JDF of the vendor "A".

The vendor "A" UI control section 62a displays the setting screen for the vendor "A" based on the determination result that the JDF is for the vendor "A" RIP engine. In the setting screen, the unit system is set to "points". Therefore, the setting screen is displayed in a manner so that the unit "points" is attached to the attribute values ("42", "42", "56", and "28").

Accordingly, as illustrated in FIG. 13A, "42 points", "42 points", "56 points" and "28 points" are displayed at the setting items "left margin", "right margin", "above margin", and "below margin", respectively.

FIG. 14A illustrates an example setting screen displayed by the vendor "B" UI control section 62b, and FIG. 14B illustrates an example JDF generated by the application 12 of the vendor "B".

Similarly, the vendor "B" UI control section 62b displays the setting screen for the vendor "B" based on the determination result that the JDF is for the vendor "B" RIP engine. In the setting screen, the unit system is set to "mm". Therefore, the setting screen is displayed in a manner so that the unit "mm" is attached to the attribute values ("15", "15", "20", and "10").

Accordingly, as illustrated in FIG. 14A, "15 mm", "15 mm", "20 mm" and "10 mm" are displayed at the setting items "left margin", "right margin", "above margin", and "below margin", respectively.

Figure 15:
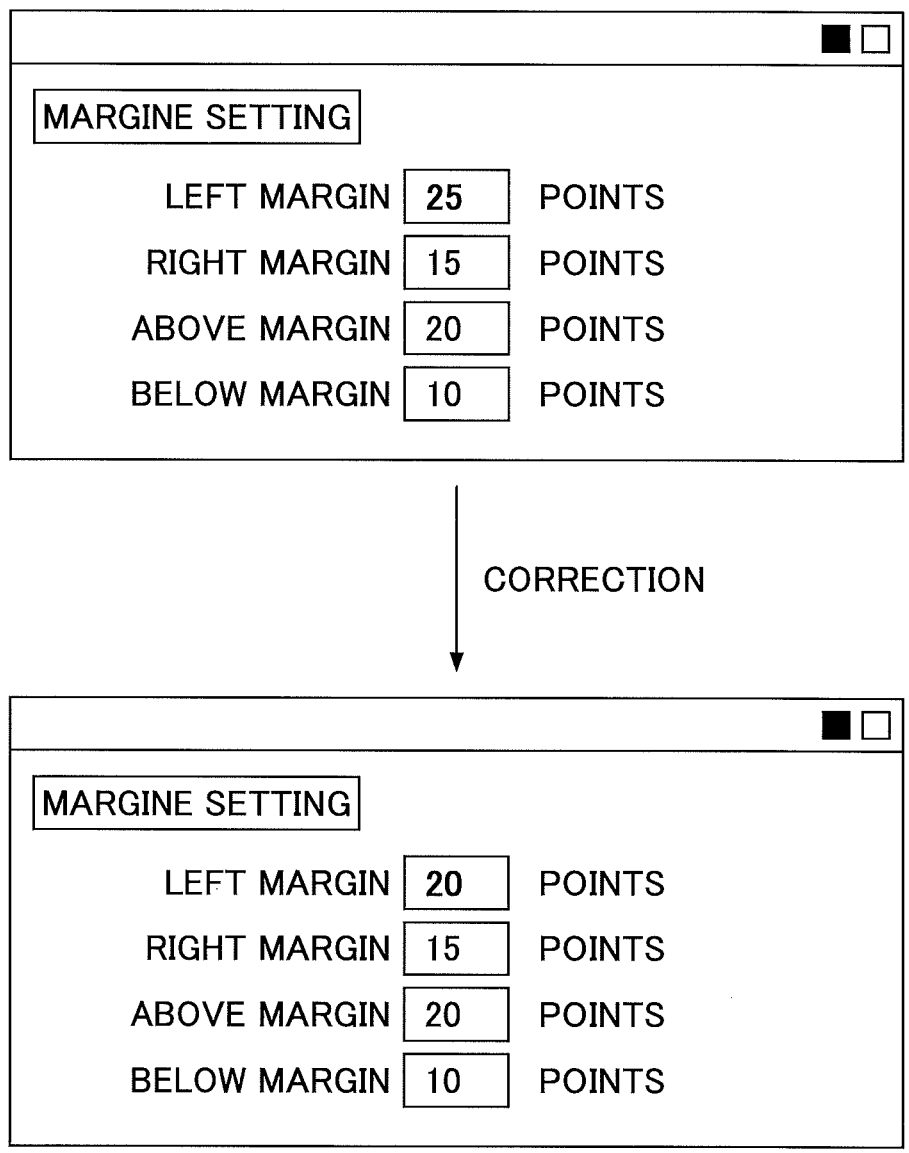
FIG. 15 is a drawing illustrating an example of changing offset amounts.

Further, as illustrated in FIG. 15, a user can set arbitrary offset amounts (margin amount) using a keyboard, etc. FIG. 15 illustrates an example change of the offset amounts. The vendor "A" UI control section 62a compares the input offset amounts with the respective margin ranges stored in advance as the ranges within which the vendor "A" RIP engine can perform rendering to determine whether the input offset amounts are out of the respective ranges.

When determining that the input offset amounts are out of the respective ranges, the vendor "A" UI control section 62a changes the input offset values into the upper limit values or the lower limit values of the ranges and sets the changed values. For example, in a case where the upper limit value of the left margin is 20 mm, when a user input a value 25 mm, the value 25 mm is changed into the value 20 mm because the input value 25 mm is greater than the upper limit value (20 mm). By doing this, it becomes possible to prevent the input of wrong attribute values by a user.

The JDF, that is set as described with reference to FIGS. 11A through 15, is converted into the "DFE-inside job attribute". Therefore, it becomes possible to generate the "RIP Parameter List" on which a change by a user is reflected, so that the DEF 30 can generate the raster data on which the change by the user is reflected.

Operation Procedure

Figure 16:
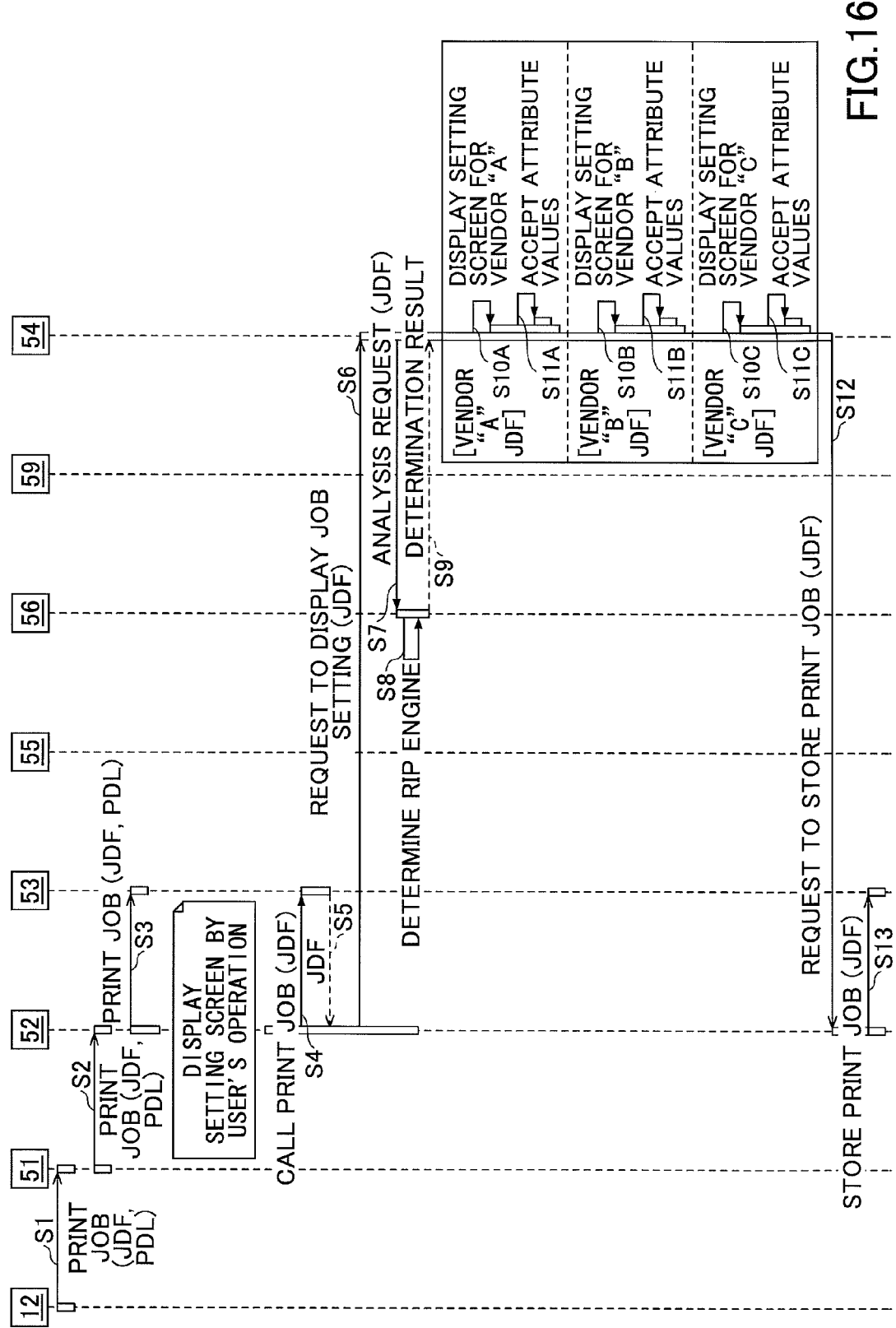
FIG. 16 is a sequence diagram of an example displaying procedure of the print job.

FIG. 16 is a sequence diagram illustrating an example procedure of displaying the print job.

Step S1: The application 12 transmits a print job (JDF and PDL) to the DFE 32.

Step S2: The job receiving section 51 outputs the print job (JDF and PDL) to the system control section 52.

Step S3: The system control section 52 stores the print job into the job data storage section 53. It is assumed that whether the print job is to be stored in the job data storage section 53 or output to the job control section 55 is set (determined) in advance.

After that, a user operates the DFE 32 to display the print job, which is stored in the job data storage section 53, on the display 330.

Step S4: In accordance with the user's operations, the system control section 52 sends a print job call to the job data storage section 53.

Step S5: The system control section 52 reads the JDF of the instructed (called) print job from the job data storage section 53.

Step S6: The system control section 52 outputs the JDF along with the request to display the content of the print job to the UI control section 54.

Step S7: The UI control section 54 outputs an analysis request along with the JDF to the JDF analysis section 56.

Step S8: The JDF analysis section 56 refers to the extended tag and determines the RIP engine 59 for which the JDF is generated.

Step S9: The JDF analysis section 56 outputs the determination result of RIP engine 59 to the UI control section 54.

In the following, any one of steps S10A and S11A, steps S10B and S11B, and steps S10C and S11C is executed.

Step S10A: When the JDF is generated for the vendor "A" RIP engine, the vendor "A" UI control section 62a displays the setting screen for the vendor "A".

Step S11A: The vendor "A" UI control section 62a accepts the settings and the selections of the attribute values by a user's selections (operations).

Step S10B: When the JDF is generated for the vendor "B" RIP engine, the vendor "B" UI control section 62b displays the setting screen for the vendor "B".

Step S11B: The vendor "B" UI control section 62b accepts the settings and the selections of the attribute values by a user's selections (operations).

Step S10C: When the JDF is generated for the vendor "C" RIP engine, the vendor "C" UI control section 62c displays the setting screen for the vendor "C".

Step S11C: The vendor "C" UI control section 62c accepts the settings and the selections of the attribute values by a user's selections (operations).

Step S12: When the user operates to store a change to the JDF, the UI control section 54 accepts the change. Then, the UI control section 54 outputs the JDF along with a request to store the print job to the system control section 52.

Step S13: The system control section 52 stores the PDL and JDF into the job data storage section 53.

Figure 17:
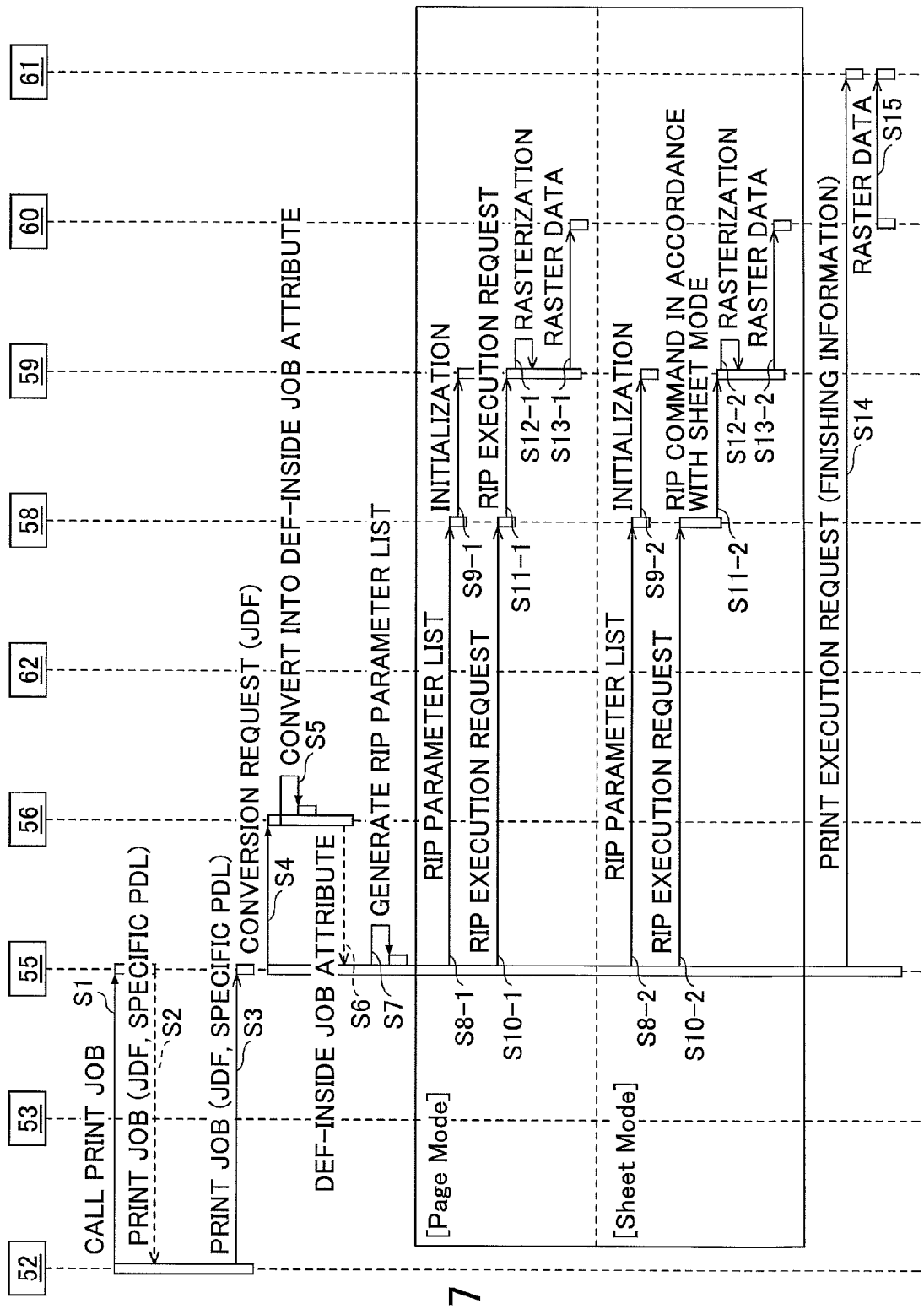
FIG. 17 is a sequence diagram of an example execution procedure of the print job stored in a job data storage section.

FIG. 17 illustrates an example execution sequence of the print job stored in the job data storage section 53.

A user operates the DFE 32 to send an instruction to execute the print job stored in the job data storage section 53 to the DFE 32.

Step S1: The system control section 52 sends a print job call to the job data storage section 53.

Step S2: The system control section 52 reads the JDF of the instructed (called) print job from the job data storage section 53.

Step S3: The system control section 52 outputs the print job (JDF and PDL) to the job control section 55.

Step S4: The job control section 55 outputs the JDF and a JDF conversion request to the JDF analysis section 56.

Step S5: The JDF analysis section 56 identifies the application that generates the JDF, and generates the "DFE-inside job attribute" based on the conversion table 64 for the RIP engine that is to perform rendering by the application 12.

Step S6: The JDF analysis section 56 outputs the "DFE-inside job attribute" to the job control section 55.

Step S7: The job control section 55 generates the "RIP Parameter List" by using the "DFE-inside job attribute" and the PDL.

The following procedure differs depending on whether the "RIP control mode" is the "page Mode" or the "Sheet Mode". First, the case of the "Page Mode" is described.

Step S8-1: The job control section 55 outputs the "RIP Parameter List" to the RIP control section 58.

Step S9-1: The RIP control section 58 initializes the RIP engine 59.

Step S10-1: The job control section 55 sends an RIP execution request to the RIP control section 58.

Step S11-1: The RIP control section 58 outputs a RIP command in place of the job control section 55. When the "RIP control mode" is the "page Mode", the RIP control section 58 outputs the RIP command in a sequence appropriate for the "Page Mode".

Step S12-1: The RIP engine 59 performs the rasterization.

Step S13-1: The RIP engine 59 stores the raster data into the image storage section 60.

Next, the case of the "Sheet Mode" is described.

Step S8-2: The job control section 55 outputs the "RIP Parameter List" to the RIP control section 58.

Step S9-2: The RIP control section 58 initializes the RIP engine 59.

Step S10-2: The job control section 55 sends the RIP execution request to the RIP control section 58.

Step S11-2: When the "RIP control mode" is the "Sheet Mode", the RIP control section 58 outputs the RIP commands by a sequence adapted to the "Sheet Mode".

Step S12-2: The RIP engine 59 performs the rasterization.

Step S13-2: The RIP engine 59 stores the raster data into the image storage section 60.

Therefore, the operations of the job control section 55 are not different regardless of whether the "RIP control mode" is the "page Mode" or the "Sheet Mode" (i.e., the job control section 55 always operates in accordance with the "Page Mode"). This is because the RIP control section 58 can determine the difference between the "page Mode" and the "Sheet Mode" based on the "RIP control mode" and overcome (compensate for, cancel) the differences between the "page Mode" and the "Sheet Mode".

Step S14: The job control section 55 outputs the "Finishing information" along with a print execution request to the printer control section 61. The timing of this step may be before or after the raster data are generated.

Step S15: Upon receiving the print execution request, the printer control section 61 determines and prints the corresponding raster data in the image storage section 60.

As described above, the DFE 32 in this embodiment can display correct settings of the print jobs that are generated by the applications 12 of the vendors by displaying the setting screens of the print jobs corresponding to the RIP engines 59 of the vendors. Further, even when changes of the print job are received, only the changes within the ranges where the RIP engines 59 can perform printing are accepted. Therefore, it becomes possible to prevent the occurrence of the inconvenience that the RIP engines 59 cannot perform rendering.

Second Embodiment

In the first embodiment, a case is described where a user directly operates the DFE 32 to change the JDF. In a second embodiment, on the other hand, a case is descried where the DFE 32 changes the JDF by operating the client PC 11 by a user.

Figure 18:
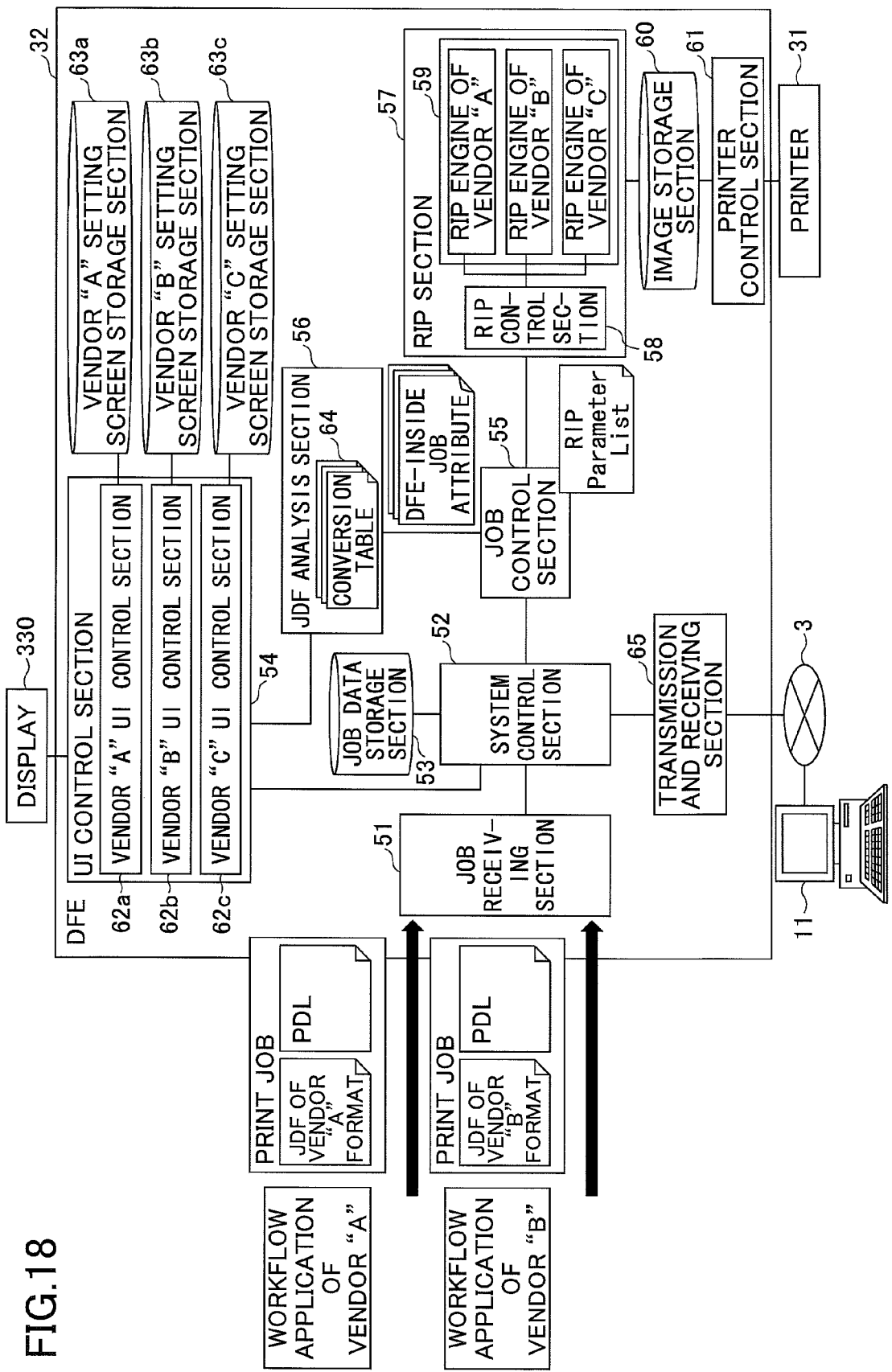
FIG. 18 is a drawing illustrating an example functional block diagram of the DFE according to a second embodiment.

FIG. 18 is an example functional block diagram of the DFE 32 according to this embodiment. Here, the same reference numerals are used to describe the same or equivalent elements as those in FIG. 5, and only main elements in this embodiment may be described.

The DFE 32 in this embodiment includes a transmission and receiving section 65, so as to be in connection with the client PC 11 via the network 3. The client PC 11 is an example of the claimed "external device" and is included in the information processing system.

In response to a communication request from the client PC 11, the transmission and receiving section 65 transmits data of the setting screen as a server. The setting screen is described in HyperText Markup Language (HTML), eXtensible Markup Language (XML), JavaScript (registered trademark), etc., so that a browser or an application of the client PC 11 displays the setting screen.

With such a configuration, a user can operate the client PC 11 to send a request to receive the setting screen to the DFE 32. For example, when a user sends a request to receive a list of the print jobs and selects a desired print job, the transmission and receiving section 65 causes the system control section 52 (or e.g., the UI control section 54) to determine the RIP engine for which the print job is generated. The system control section 52 causes the UI control section 54 to determine the RIP engine for which the print job is generated.

Then, based on the determination result, the UI control section 54 reads the setting screen from the vendor "A" setting screen storage section 63a, the vendor "B" setting screen storage section 63b, or the vendor "C" setting screen storage section 63c, and outputs the setting screen to the transmission and receiving section 65. The transmission and receiving section 65 transmits the setting screen and the JDF to the client PC 11. The user changes the attribute values and transmits the changes to the DFE 32, so that the transmission and receiving section 65 stores the JDF, in which the attribute values are changed, into the job data storage section 53 via the system control section 52.

FIG. 19 illustrates an example sequence of displaying the print job by the client PC 11. Here, the procedure in steps S1 through S3 is the same as that in FIG. 16.

A user operates the client PC 11, so as to acquire a list of the print jobs stored in the job data storage section 53, display the list on the display 330, and select an arbitrary print job.

Step S4: The client PC 11 sends a JDF request to acquire the JDF included in the selected print job to the transmission and receiving section 65 of the DFE 32.

Step S5: The transmission and receiving section 65 outputs the JDF request to the system control section 52.

Step S6: The system control section 52 sends a print job call to the job data storage section 53.

Step S7: The system control section 52 reads the JDF of the instructed (called) print job from the job data storage section 53.

Step S8: The system control section 52 outputs the JDF along with a request for the setting screen to the UI control section 54.

Step S9: The UI control section 54 outputs an analysis request along with the JDF to the JDF analysis section 56.

Step S10: The JDF analysis section 56 refers to the extended tag and determines the RIP engine 59 for which the JDF is generated.

Step S11: The JDF analysis section 56 outputs the determination result of the RIP engine 59 to the UI control section 54.

Step S12: Based on the determination result, the UI control section 54 outputs any one of a setting screen for the vendor "A", a setting screen for the vendor "B", and a setting screen for the vendor "C" to the system control section 52.

Step S13: The system control section 52 outputs the received setting screen and the JDF to the transmission and receiving section 65.

Step S14: The transmission and receiving section 65 transmits the setting screen and the JDF to the client PC 11.

In the following, any one of steps S15A and S16A, steps S15B and S16B, and steps S15C and S15C is executed similar to the corresponding case described with reference to FIG. 16.

Step S17: When the user finishes changing the JDF and stores the changed JDF, the client PC 11 outputs the JDF along with a request to store the print job to the transmission and receiving section 65.

Step S18: The transmission and receiving section 65 outputs the JDF along with the request to store the print job to the system control section 52.

Step S19: The system control section 52 stores the PDL and the JDF along with into the job data storage section 53.

As described above, in this embodiment, even when a user operates the client PC 11 to output a request to store the print job 11 to change the JDF, it is possible to determine the RIP engine 59 for which the JDF is generated, so that the client PC 11 can display the JDF using the setting screen adopted to the RIP engine 59.

Preferred Modification

As described above, preferred embodiments are described. However, it should be noted that the present invention is not limited to those embodiments. Various modifications and replacements may also be made without departing from the scope of the present invention.

For example, in FIG. 5, the DFE 32 includes all functions. However, any of the functions may be implemented in a separated apparatus that is in communication via a network. For example, the RIP engines 59 and the JDF analysis sections 56 of the vendors may be provided on a network accessible from the DFE 32.

This may also be applied to the image storage section 60 and the job data storage section 53, so that those sections may be provided on a network accessible from the DFE 32.

Further, the vendor "A" setting screen storage section 63a, the vendor "B" setting screen storage section 63b, and the vendor "C" setting screen storage section 63c may be externally provided. In this case, the DFE 32 acquires the respective setting screens from the setting screen storage section 63a, the vendor "B" setting screen storage section 63b, and the vendor "C" setting screen storage section 63c which are externally provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus for generating drawing data by using a print job, comprising:
   a plurality of drawing data generation units configured to generate the drawing data by using the print job;
   a determination unit configured to analyze the print job and determine any one of the drawing data generation units that is to generate the drawing data by using the print job; and
   a screen display unit configured to display a display screen of settings of the print job on a display part by selecting the display screen based on a result determined by the determination unit,
   wherein the print job includes print data and setting information,
   wherein the setting information includes settable setting values which are determined in accordance with the any one of the drawing data generation units, determined by the determination unit, and setting items of the print job,
   wherein the screen display unit is configured to display the settable setting values,
   wherein the setting information includes settable setting values which are determined in accordance with the any one of the drawing data generation units determined by the determination unit and setting items of the print job,
   wherein the screen display unit is configured to accept a change to setting values that are included within ranges of the settable setting values determined in accordance with the any one of the drawing data generation units determined by the determination unit, and
   wherein the any one of the drawing data generation units is configured to generate the drawing data by using the print job that includes the setting information including the changed setting values that are included within the ranges of the settable setting values.

2. The information processing apparatus according to claim 1,
   wherein the screen display unit is configured to display only the settable setting values, in a selectable manner, in the setting information corresponding to the any one of the drawing data generation units determined by the determination unit, and
   wherein the any one of the drawing data generation units is configured to generate the drawing data by using the print job in which the settable setting values are selected.

3. The information processing apparatus according to claim 1,
   wherein the screen display unit is configured to display the settable setting values included in the setting information based on a unit of the any one of the drawing data generation units determined by the determination unit.

4. The information processing apparatus according to claim 3,
   wherein the screen display unit is configured to, in a case where the setting information includes setting of margins for printing positions relative to a printing sheet, display the settable setting values of the margins for the printing positions based on a unit of the any one of the drawing data generation units determined by the determination unit.

5. The information processing apparatus according to claim 4,
   wherein the screen display unit is configured to, in a case where displayed setting values of the margins are changed, compare the changed setting values with corresponding predetermined upper limit values and lower limit values, change the changed setting values to the corresponding predetermined upper limit values when the changed setting values are greater than the corresponding predetermined upper limit values, change the changed setting values to the corresponding predetermined lower limit values when the changed setting values are less than the corresponding predetermined lower limit values, and display the changed setting values.

6. The information processing apparatus according to claim 1,
wherein the screen display unit is configured to determine collective modes of collective printing by which the any one of the drawing data generation units determined by the determination unit can generate the drawing data and display only the setting values corresponding to the collective modes of the collective printing in a case where the setting information includes a setting of the collective printing.

7. The information processing apparatus according to claim 6,
wherein the screen display unit is configured to accept only a change into the settable setting values in the collective mode of the collective printing by which the any one of the drawing data generation units, determined by the determination unit, can generate the drawing data, and
wherein the any one of the drawing data generation units is configured to generate the drawing data in the collective mode of collective printing corresponding to the accepted change into the settable setting values.

8. An information processing apparatus for generating drawing data by using a print job, comprising:
a plurality of drawing data generation units configured to generate the drawing data by using the print job;
a determination unit configured to analyze the print job and determine any one of the drawing data generation units that is to generate the drawing data by using the print job; and
a screen transmission unit configured to select a display screen of settings of the print job, the display screen being to be transmitted to an external device and being selected based on a result determined by the determination unit,
wherein the print job includes print data and setting information,
wherein the setting information includes settable setting values which are determined in accordance with the any one of the drawing data generation units, determined by the determination unit, and setting items of the print job,
wherein the display screen displays the settable setting values,
wherein the setting information includes settable setting values which are determined in accordance with the any one of the drawing data generation units determined by the determination unit and setting items of the print job,
wherein the display screen accepts a change to setting values that are included within ranges of the settable setting values determined in accordance with the any one of the drawing data generation units determined by the determination unit, and
wherein the any one of the drawing data generation units is configured to generate the drawing data by using the print job that includes the setting information including the changed setting values that are included within the ranges of the settable setting values.

9. An information processing system for generating drawing data by using a print job, comprising:
a print job storage unit configured to store the print job;
a plurality of drawing data generation units configured to generate the drawing data by using the print job;
a determination unit configured to analyze the print job and determine any one of the drawing data generation units that is to generate the drawing data by using the print job; and
a screen display unit configured to display a display screen of settings of the print job on a display part by selecting the display screen based on a result determined by the determination unit,
wherein the print job includes print data and setting information,
wherein the setting information includes settable setting values which are determined in accordance with the any one of the drawing data generation units, determined by the determination unit, and setting items of the print job,
wherein the screen display unit is configured to display the settable setting values,
wherein the setting information includes settable setting values which are determined in accordance with the any one of the drawing data generation units determined by the determination unit and setting items of the print job,
wherein the screen display unit is configured to accept a change to setting values that are included within ranges of the settable setting values determined in accordance with the any one of the drawing data generation units determined by the determination unit, and
wherein the any one of the drawing data generation units is configured to generate the drawing data by using the print job that includes the setting information including the changed setting values that are included within the ranges of the settable setting values.

10. A non-transitory computer-readable recording medium storing a program causing at least one of a plurality of drawing data generation units included in an information processing apparatus to execute an information processing method of generating drawing data by using a print job including print data and setting information, the method comprising:
a determination step of analyzing the print job and determining the at least one of the drawing data generation units that is to generate the drawing data by using the print job;
a screen displaying step of displaying a display screen of settings of the print job on a display part by selecting the display screen based on a result determined in the determination step; and
a drawing data generation step of generating the drawing data by using the print job that is displayed in the screen displaying step by the at least one of the drawing data generation units determined in the determination step,
wherein the print job includes print data and setting information,
wherein the setting information includes settable setting values which are determined in accordance with the any one of the drawing data generation step, determined in the determination step, and setting items of the print job,
wherein in the screen display step, the settable setting values are displayed,
wherein the setting information includes settable setting values which are determined in accordance with the any one of the drawing data generation units determined by the determination unit and setting items of the print job,
wherein the screen display unit is configured to accept a change to setting values that are included within ranges of the settable setting values determined in accordance with the any one of the drawing data generation step determined in the determination step, and wherein in the drawing data generation step, the drawing data are generated by using the print job that includes the setting information including the changed setting values that are included within the ranges of the settable setting values.

11. A non-transitory computer-readable recording medium storing a program causing at least one of a plurality of drawing data generation units included in an information processing apparatus to execute an information processing method of generating drawing data by using a print job including print data and setting information, the method comprising:
- a determination step of analyzing the print job and determining the at least one of the drawing data generation units that is to generate the drawing data by using the print job;
- a screen displaying step of displaying a display screen of settings of the print job on a display part by selecting the display screen based on a result determined in the determination step; and
- a drawing data output step of outputting the print job that is displayed in the screen displaying step to the at least one of the drawing data generation units determined in the determination step, wherein the print job includes print data and setting information, wherein the setting information includes settable setting values which are determined in accordance with the any one of the drawing data output step, determined in the determination step, and setting items of the print job, wherein in the screen display step, the settable setting values are displayed, wherein the setting information includes settable setting values which are determined in accordance with the any one of the drawing data generation units determined by the determination unit and setting items of the print job, wherein the screen display unit is configured to accept a change to setting values that are included within ranges of the settable setting values determined in accordance with the any one of the drawing data output step determined in the determination step, and wherein in the drawing data output step, the drawing data are generated by using the print job that includes the setting information including the changed setting values that are included within the ranges of the settable setting values.

* * * * *